United States Patent
Bouissou

(10) Patent No.: US 10,915,422 B2
(45) Date of Patent: Feb. 9, 2021

(54) AUTOMATIC SETTING OF MULTITASKING CONFIGURATIONS FOR A CODE-CHECKING SYSTEM

(71) Applicant: The MathWorks, Inc., Natick, MA (US)

(72) Inventor: Olivier Bouissou, Paris (FR)

(73) Assignee: The MathWorks, Inc., Natick, MA (US)

(*) Notice: Subject to any disclaimer, the term of this patent is extended or adjusted under 35 U.S.C. 154(b) by 0 days.

(21) Appl. No.: 15/972,662

(22) Filed: May 7, 2018

(65) Prior Publication Data

US 2019/0179727 A1   Jun. 13, 2019

(30) Foreign Application Priority Data

Dec. 13, 2017  (EP) .................................. 17290160
Apr. 17, 2018  (DE) ....................... 10 2018 003 142

(51) Int. Cl.
*G06F 11/36*   (2006.01)
*G06F 8/41*    (2018.01)
*G06F 8/34*    (2018.01)

(52) U.S. Cl.
CPC ............ *G06F 11/3604* (2013.01); *G06F 8/43* (2013.01); *G06F 8/34* (2013.01)

(58) Field of Classification Search
CPC ......... G06F 11/36–3696; G06F 9/4881; G06F 9/4818; G06F 8/35; G06F 8/43

(Continued)

(56) References Cited

U.S. PATENT DOCUMENTS 5,962,153 A   10/1999  Kirino et al.
6,625,759 B1   9/2003  Petsinger et al.
(Continued)

FOREIGN PATENT DOCUMENTS

CN   104090798 A   10/2014

OTHER PUBLICATIONS

Groce et al., Establishing flight software reliability: Testing, model checking, constraint-solving, monitoring and learning. Annals of Mathematics and Artificial Intelligence. Apr. 1, 2014;70(4):315-49.
(Continued)

*Primary Examiner* — Todd Aguilera
(74) *Attorney, Agent, or Firm* — Wolf, Greenfield & Sacks, P.C.

(57) ABSTRACT

Methods and systems are described for automatically setting multitasking configurations that are used to check, by a code-checking system, implementation code that is to be deployed on a dynamic system. Attributes of implemented tasks and interrupt service routines that can run concurrently on the dynamic system are determined from one or more specification data structures of a specified model and associated with independent, implemented computational threads prepared from the specified model. Configured with information relevant to the concurrent threads, the code-checking system can more accurately determine the presence or absence of defects in the implementation code. The specified model, resulting implemented code, and dynamic system can be complex and comply with a standardized software architecture, such as Automotive Open System Architecture (AUTOSAR).

28 Claims, 23 Drawing Sheets

(58) Field of Classification Search
USPC .................................................. 717/124–135
See application file for complete search history.

(56) References Cited

U.S. PATENT DOCUMENTS

| | | | |
|---|---|---|---|
| 7,574,690 B2* | 8/2009 | Shah | G06F 8/34 |
| | | | 700/83 |
| 8,020,153 B2 | 9/2011 | Aoshima et al. | |
| 8,448,130 B1* | 5/2013 | Pillarisetti | G06F 8/447 |
| | | | 717/104 |
| 8,464,204 B1* | 6/2013 | Thornton | G06F 11/3608 |
| | | | 717/100 |
| 8,745,594 B1 | 6/2014 | Iossiphidis et al. | |
| 8,856,726 B2 | 10/2014 | Conrad et al. | |
| 8,990,783 B1* | 3/2015 | Yu | G06F 8/35 |
| | | | 703/22 |
| 9,460,251 B1 | 10/2016 | Haridass et al. | |
| 9,588,877 B1 | 3/2017 | Adir et al. | |
| 10,275,227 B1 | 4/2019 | Vompolu et al. | |
| 10,296,443 B2 | 5/2019 | Grechanik | |
| 10,387,585 B2 | 8/2019 | Manoj Gangadhar | |
| 2001/0034594 A1 | 10/2001 | Kohno et al. | |
| 2004/0015897 A1 | 1/2004 | Thompson et al. | |
| 2005/0050515 A1* | 3/2005 | Shah | G06F 8/34 |
| | | | 717/113 |
| 2006/0041860 A1* | 2/2006 | Carmichael | G06F 8/34 |
| | | | 717/109 |
| 2007/0220342 A1 | 9/2007 | Vieira et al. | |
| 2007/0266366 A1 | 11/2007 | Bucuvalas | |
| 2008/0086705 A1 | 4/2008 | Balasubramanian et al. | |
| 2008/0109475 A1 | 5/2008 | Burmester et al. | |
| 2011/0088011 A1 | 4/2011 | Ouali | |
| 2012/0101800 A1 | 4/2012 | Miao et al. | |
| 2014/0013313 A1 | 1/2014 | Eker et al. | |
| 2014/0068697 A1 | 3/2014 | Brucker et al. | |
| 2014/0122028 A1 | 5/2014 | Aberg | |
| 2015/0135166 A1 | 5/2015 | Tarlow et al. | |
| 2015/0309920 A1 | 10/2015 | Ishigooka et al. | |
| 2016/0078539 A1 | 3/2016 | Ignatovich et al. | |
| 2016/0085883 A1 | 3/2016 | Shiraishi et al. | |
| 2016/0224456 A1 | 8/2016 | Weich | |
| 2016/0371060 A1 | 12/2016 | Goja et al. | |
| 2016/0371167 A1 | 12/2016 | Manolios | |
| 2017/0039039 A1 | 2/2017 | Johnson et al. | |
| 2017/0075787 A1 | 3/2017 | Muske | |
| 2017/0131975 A1 | 5/2017 | Balasubramanian et al. | |
| 2017/0139678 A1 | 5/2017 | Funakoshi | |
| 2017/0154137 A1 | 6/2017 | Shakeri et al. | |
| 2017/0262356 A1 | 9/2017 | Ramanathan et al. | |
| 2017/0351493 A1 | 12/2017 | Kintali | |
| 2018/0046571 A1 | 2/2018 | Magill et al. | |
| 2018/0196739 A1 | 7/2018 | Li et al. | |
| 2018/0314619 A1 | 11/2018 | Jagadeesan et al. | |
| 2018/0349103 A1 | 12/2018 | Brown et al. | |
| 2019/0012257 A1 | 1/2019 | Indurthivenkata et al. | |
| 2019/0163446 A1* | 5/2019 | Brunel | G06F 8/42 |

OTHER PUBLICATIONS

Durisic et al., ARCA—Automated Analysis of AUTOSAR Metamodel Changes. 2015 IEEE/ACM 7th International Workshop on Modeling in Software Engineering. May 16, 2015:30-5.

Goli et al., Automatic equivalence checking for SystemC-TLM 2.0 models against their formal specifications. IEEE Design, Automation & Test in Europe Conference & Exhibition (DATE). Mar. 27, 2017:630-3.

Goli et al., Automatic protocol compliance checking of SystemC TLM-2.0 simulation behavior using timed automata. 2017 IEEE 35th International Conference on Computer Design (ICCD). Nov. 5, 2017:377-84.

U.S. Appl. No. 15/861,021, filed Jan. 3, 2018, Brunei et al.

Extended European Search Report for European Application No. 17290155.5, dated Jun. 6, 2018.

* cited by examiner

```xml
<ECUC-CONTAINER-VALUE UUID="6f8bf641-d96d-46c7-b515-b04436e81845">
  <SHORT-NAME>Cpod_MainFunc_Timing1</SHORT-NAME>
  <DEFINITION-REF DEST="ECUC-PARAM-CONF-CONTAINER-DEF">/MICROSAR/Rte/RteBswModuleInstance/
    RteBswEventToTaskMapping</DEFINITION-REF>
  <PARAMETER-VALUES>
    <ECUC-NUMERICAL-PARAM-VALUE>
      <DEFINITION-REF DEST="ECUC-BOOLEAN-PARAM-DEF">/MICROSAR/Rte/RteBswModuleInstance/RteBswEventToTaskMapping/
      <VALUE>false</VALUE>
    </ECUC-NUMERICAL-PARAM-VALUE>
    <ECUC-NUMERICAL-PARAM-VALUE>
      <DEFINITION-REF DEST="ECUC-INTEGER-PARAM-DEF">/MICROSAR/Rte/RteBswModuleInstance/RteBswEventToTaskMapping/
      <VALUE>7</VALUE>
    </ECUC-NUMERICAL-PARAM-VALUE>
  </PARAMETER-VALUES>
  <REFERENCE-VALUES>
    < ECUC-REFERENCE-VALUE>
      <DEFINITION-REF DEST="ECUC-FOREIGN-REFERENCE-DEF">/MICROSAR/Rte/RteBswModuleInstance/
      <VALUE-REF DEST="BSW-TIMING-EVENT">/MICROSAR/Cpod_ib_bswmd/BwsModuleDescriptions/Cpod/CpodBehavior/
    </ECUC-REFERENCE-VALUE>
    < ECUC-REFERENCE-VALUE>
      <DEFINITION-REF DEST="ECUC-REFERENCE-DEF">/MICROSAR/Rte/RteBswModuleInstance/RteBswEventToTaskMapping/
      <VALUE-REF DEST=ECUC-CONTAINER-VALUE">/ActiveEcuC/Os/T1_speed_100ms</VALUE-REF>
    </ECUC-REFERENCE-VALUE>
    < ECUC-REFERENCE-VALUE>
      <DEFINITION-REF DEST="ECUC-REFERENCE-DEF">/MICROSAR/Rte/RteBswModuleInstance/RteBswEventToTaskMapping/
      <VALUE-REF DEST="ECUC-CONTAINER-VALUE">/ActiveEcuC/Os/RteEvCyc2_T1_speed_100ms</VALUE-REF>
    </ECUC-REFERENCE-VALUE>
```

*FIG. 4C*

```
510a ─┬─<ECUC-CONTAINER-VALUE>
      │  <SHORT-NAME>OSal_Caesar</SHORT-NAME>
510b ─┤  <DEFINITION-REF DEST="ECUC-PARAM-CONF-CONTAINER-DEF">/AUTOSAR_Os/EcucModuleDefs/Os/OsAlarm</DEFINITION-REF>
      │  <PARAMETER-VALUES />                                                              512
      │  <REFERENCE-VALUES>
      │    <ECUC-REFERENCE-VALUE>
      │      <DEFINITION-REF DEST="ECUC-REFERENCE-DEF">/AUTOSAR_Os/EcucModuleDefs/Os/OsAlarm/OsAlarmCounterRef</DEFINIT
      │      <VALUE-REF DEST= "ECUC-CONTAINER-VALUE">rtk_cpu/OsRTA/OScnt_100us</VALUE-REF>
      │    </ECUC-REFERENCE-VALUE>
      │  </REFERENCE-VALUES>
520a ─┬─<SUB-CONTAINERS>
      │  <ECUC-CONTAINER-VALUE>
      │    <SHORT-NAME>OsAlarmAction</SHORT-NAME>
520b ─┤    <DEFINITION-REF DEST="ECUC-CHOICE-CONTAINER-DEF">/ AUTOSAR_Os/EcucModuleDefs/Os/OsAlarm/OsAlarmAction</DEFI
      │    <PARAMETER-VALUES />                                                              522
      │    <REFERENCE-VALUES />
530a ─┬─  <SUB-CONTAINERS>
      │    <ECUC-CONTAINER-VALUE>
      │      <SHORT-NAME>OsAlarmActivateTask</SHORT-NAME>
530b ─┤      <DEFINITION-REF DEST="ECUC-...-DEF">/ AUTOSAR_Os/EcucModuleDefs/Os/OsAlarm/OsAlarmActivateTask</DEFINTION-
      │      <PARAMETER-VALUES />                                                            532
      │      <REFERENCE-VALUES>
      │        <ECUC-REFERENCE-VALUE>
530c ─┤        <DEFINITION-REF DEST="ECUC-REFERENCE-DEF">/ AUTOSAR_Os/EcucModuleDefs/Os/OsAlarm/OsAlarmAction/OsA1
      │          <VALUE-REF DEST= "ECUC-CONTAINER-VALUE">/rtk_cpu/OsRTA/OsTsk_Check_Temp</VALUE-REF>
      │        </ECUC-REFERENCE-VALUE>                            534
      │      </REFERENCE-VALUES>
      │    </SUB-CONTAINERS />
      │    </ECUC-CONTAINER-VALUE>
      │  </SUB-CONTAINERS>
      └─</ECUC-CONTAINER-VALUE>
                  501
```

*FIG. 5A*

```
<ECUC-REFERENCE-VALUE>
    <DEFINITION-REF DEST="ECUC-REFERENCE-DEF">/ AUTOSAR_Os/EcucModuleDefs/Os/OsApplication/OsAppTaskRef
        </DEFINITION-REF>
    <VALUE-REF DEST="ECUC-CONTAINER-VALUE"/rtk_cpu/OsRTA/OsTsk_Check_Temp </VALUE-REF>
</ECUC-REFERENCE-VALUE>
                                          534a                    552
502
```

FIG. 5B

```
540a ─<ECUC-CONTAINER-VALUE>    552
550  ─<SHORT-NAME>OsTsk_Check_Temp</SHORT-NAME>
540b ─<DEFINITION-REF DEST="ECUC-PARAM-CONF-CONTAINER-DEF">/ AUTOSAR_Os/EcucModuleDefs/Os/OsTask<DEFINITION-REF>
    <PARAMETER-VALUES>
        <ECUC-NUMERICAL-PARAM-VALUE>
            <DEFINITION-REF DEST="ECUC-INTEGER-PARAM-DEF">/AUTOSAR_Os/EcucModuleDefs/Os/OsTask/OsTaskActivation
                </DEFINITION-REF>
            <VALUE>1</VALUE>
        </ECUC-NUMERICAL-PARAM-VALUE>
```

FIG. 5C

```
<ECUC-CONTAINER-VALUE UUID="3375441c-981f-54bec3bb0d46">
920a ──<SHORT-NAME>Task_90_C</SHORT-NAME>
    <DEFINITION-REF DEST="ECUC-PARAM-CONF-CONTAINER-DEF">
    /MICROSAR/RH850_F1H/Os/OsTask</DEFINITION-REF>

</ECUC-CONTAINER-VALUE>
```

```
<ECUC-CONTAINER-VALUE UUID="6f8bf641-d96d-b04436e81845">
    <SHORT-NAME>IpduM_MainFunctionTimingEvent0</SHORT-NAME>

920b ──<VALUE-REF DEST=ECUC-CONTAINER-VALUE>/ActiveEcuC/Os/eTask1
    </VALUE-REF>                                           922

</ECUC-CONTAINER-VALUE>
```

```
960a ──TASK (eTask1) /* PRQA S 3408, 1503 */ /* MD_Rte_3408, MD_MSR_14.1 */
{
    EventMaskType ev;
    /*************************************************************
    *      << Start manually changes LK >>
    *************************************************************/
    SdsHdl_Init();
    .
```

```
/*******************************************************************
 * Task:        Task_9ms
 * Priority:    80
 * Schedule:    FULL
 *******************************************************************/
(void eventTaskfunc1(void)
{
    EventMaskType ev;
    /***************************************************************
     *      <<Start manually changes LK
     ***************************************************************/
    SdsHdl_Init();
```

960b points to `(void eventTaskfunc1(void)`
904

FIG. 9D

```
/*******************************************************************
 * Task:        Task_9ms
 * Priority:    80
 * Schedule:    FULL
 *******************************************************************/
void eTask1_ID1(void)
{
    EventMaskType ev;
    /***************************************************************
     *      <<Start manually changes LK
     ***************************************************************/
    SdsHdl_Init();
```

```
/************************************************************
 * TASK:          Airbag1
 * Priority:      8
 * Schedule:      Full
 ************************************************************/
void airbag1func1(void)
{
.
SdsHdl_Init();
.
```
1020b — `TakeResource(BasicAirbagRes1)`
```
  /* begin protected code */
  .
  .
  /* end protected code */
```
1020c — `ReleaseResource(BasicAirbagRes1)`
```
.
}
```
1002

FIG. 10A

```
/************************************************************
 * TASK:          Airbag1
 * Priority:      8
 * Schedule:      Full
 ************************************************************/
void airbag1_ID1(void)
{
.
SdsHdl_Init();
.
 TakeResource_BasicAirbag_R1()
  /* begin protected code */
  .
  .
  /* end protected code */
 ReleaseResource_BasicAirbag_R1()
.
}
```
1003

FIG. 10B

AUTOMATIC SETTING OF MULTITASKING CONFIGURATIONS FOR A CODE-CHECKING SYSTEM

RELATED APPLICATION DATA

This application claims priority to European patent application No. 17290160.5, titled "Automatic Setting of Multitasking Configurations for a Code-Checking System" filed on Dec. 13, 2017 and to German patent application No. 102018003142.0, titled "Automatic Setting of Multitasking Configurations for a Code-Checking System" filed on Apr. 17, 2018, both of which applications are herein incorporated by reference.

SUMMARY

The described technology relates to automated configuration and analysis, by a code-checking system, of implementation code that has been prepared from a specified model. The implementation code can include computational threads that execute concurrently on at least one processor of a complex, dynamic system (e.g., an automobile or other intelligent apparatus) to provide automated and/or semi-automated control of the dynamic system. Automated configuration of the code-checking system can comprise configuring settings for multitasking code-analysis of the implementation code based on information discerned from at least the specified model. In embodiments, the code-checking system is adapted to detect, or prove the absence of, defects (such as bugs and runtime errors) in the analyzed parts of the implementation code as well as provide warnings of code that may include potential runtime errors.

Portions of the implementation code can include a plurality of code threads associated with tasks, interrupt service routines (ISRs), and resources that can be defined in the specified model. At least some of the code threads can run concurrently in the dynamic system. To improve the speed and accuracy of analysis of the implementation code, attributes of tasks, ISRs, and/or resources can be automatically detected in the specified model and associated with corresponding code threads in the implementation code. Information relevant to the tasks, ISRs, and resources can be provided to the code-checking system for automatically setting multitasking configurations of the code-checking system.

Some embodiments relate to a computer-implemented method for checking implementation code for defects and automatically configuring a code-checking system based on information relevant to concurrency of computational threads in the implementation code. A computer-implemented method can comprise acts of receiving, by a data analyzer, one or more data structures containing information that specifies tasks to be implemented in the form of parts of implementation code that controls a dynamic system, wherein a portion of the tasks are to be executed concurrently on a processor of the dynamic system using different computational threads within the parts of the implementation code; automatically analyzing, by the data analyzer, the one or more data structures to identify specified task identifiers for each task of the portion of the tasks; automatically analyzing, by the data analyzer, the one or more data structures to identify task attributes relevant to concurrent execution of the portion of the tasks on the processor of the dynamic system; and providing information regarding task identity and the task attributes of the portion of the tasks for automatically performing code checking of the parts of the implementation code to detect, or prove the absence of, defects in the parts of the implementation code. A method of automatically setting multitasking configurations for a code-checking system can further include acts of receiving, by the code-checking system, the one or more data structures; receiving, by the code-checking system, a portion of the implementation code containing the parts of the implementation code; receiving, by the code-checking system, the information about task identity and the task attributes; receiving, by the code-checking system, the information about the ISRs; processing, by a code tracing processor, at least a portion of the one or more data structures to automatically produce comparative code using one or more altered task identifiers for the specified task identifiers; analyzing the comparative code and the received portion of the implementation code to identify the computational threads in the parts of the implementation code that corresponds to the specified task identifiers; associating the received task attributes with their corresponding computational threads; and statically analyzing, by the code-checking system, the parts of the implementation code based on the associated task attributes and received information regarding the ISRs to detect, or prove the absence of, defects in the parts of the implementation code.

Some embodiments relate to a data-processing system, comprising at least one processor, that is adapted with computer program instructions to execute one or more methods related to automatically setting multitasking configurations in a code-checking system as described above and in further detail below.

Some embodiments relate to computer-readable medium encoding computer program instructions that, when executed by at least one processor, perform one or more methods related to automatically setting multitasking configurations in a code-checking system as described above and in further detail below.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 4C illustrates an example of a portion of a specified model in which an event is mapped to a task in a specified model and a fully-qualified name is provided for the task;

FIG. 5A illustrates an example of a portion of a specified model in which an alarm is defined;

FIG. 5B illustrates an example of a portion of a specified model in which a task associated with the alarm in FIG. 5A is referenced;

FIG. 5C illustrates an example of a portion of a specified model in which a task associated with the alarm in FIG. 5A is defined;

FIG. 9A illustrates an example of a portion of a specified model in which a task is defined and given a short name;

FIG. 9B illustrates an example of a portion of a specified model in which a fully-qualified name for the task of FIG. 9A is provided;

FIG. 9C illustrates an example of a portion of intermediate code produced from the specified model containing the portion of specified model shown in FIG. 9B;

FIG. 9D illustrates an example part of implementation code produced from intermediate code containing the portion of intermediate code shown in FIG. 9C, according to one code-preprocessing algorithm;

FIG. 9E illustrates an example part of implementation code produced from intermediate code containing the portion of intermediate code shown in FIG. 9C, according to a predetermined code-preprocessing algorithm;

FIG. 10A illustrates an example section of implementation code produced from intermediate code containing a resource, according to one code-preprocessing algorithm;

FIG. 10B illustrates an example section of implementation code produced from intermediate code containing a resource, according to a predetermined code-preprocessing algorithm;

Figure 1:
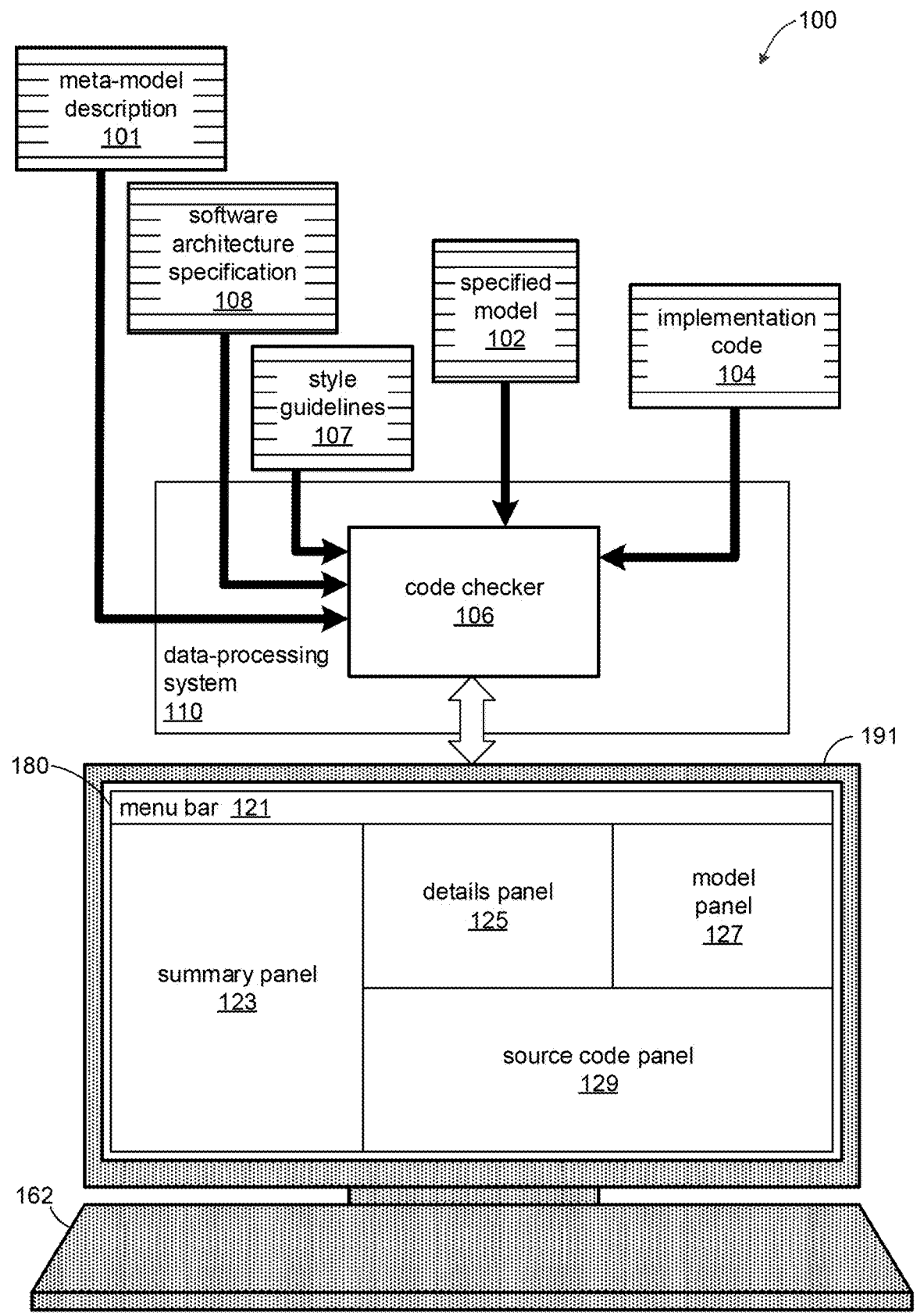
FIG. 1 depicts, in overview, an example of a system adapted to analyze implementation code.

The features and advantages of the present invention will become more apparent from the detailed description set forth below when taken in conjunction with the drawings.

DETAILED DESCRIPTION

Examples of dynamic systems relevant to the present embodiments include, but are not limited to, automobiles, avionic instruments, aerospace machines, marine vehicles, power generators, construction machinery, mining machinery, agricultural machinery, and forestry machinery. In some instances, the present embodiments can also apply to complex, dynamic multi-processor computational systems. In embodiments, a dynamic system may include one or more networked computers (e.g., embedded computers) that interact with each other. Examples of dynamic systems include vehicles (such as automobiles), physical plants, or stationary machinery and a corresponding control system (e.g., a system comprising any combination of: one or more feedback controllers, one or more programmable logic controllers, one or more processors (which includes microcontrollers and microprocessors), one or more field-programmable gate arrays, and one or more digital signal processors) that performs automated or semi-automated control of the vehicle, plant, or machine. As may be appreciated, integration of modern diagnostic and control electronics into dynamic electromechanical systems, for example, can result in appreciably complex automated or semi-automated control of such systems. In some cases, a system-control code can comprise millions of lines of code distributed in thousands of files and possibly written in different computer languages, as is the case for some modern automobiles. Further, the code can be executed in a distributed processing environment. For example, even within a single modern automobile the distributed processing environment can contain over one hundred microcontrollers and microprocessors executing the system-control code.

To aid in development, manufacturing, and servicing of such systems, manufacturers or representatives from related industries may collaborate on methodology by which system-control codes are structured for implementation on such complex systems. One such collaboration is among automotive manufacturers, their suppliers, and companies from the electronics and software industries. The collaboration has resulted in the development of the Automotive Open System Architecture known as AUTOSAR. AUTOSAR was originally developed as a software architecture specification that places restrictions on how computer code can be implemented in system control of automobiles, though the specification has been adopted for other types of machinery listed above.

An objective of AUTOSAR (and other software architecture specifications) is to make development of implementation code by system-control engineers essentially independent of the underlying hardware infrastructure rather than having implementation code that is highly specialized to the underlying hardware. This allows transferability of the code to any hardware that supports the relevant software architecture specification. By adhering to the software architecture specification, a system engineer can develop code that determines the behavior of various physical system components (e.g., sensors, actuators, microcontrollers, motors, etc.) with little or no knowledge about communication and operation details of the physical components. For example, a system engineer can prepare a specified model under guidelines that comply with system-build guidelines. In embodiments, a specified model of a software architecture specification specifies at least behavior and/or functionalities of code portions that are to be executed as control algorithms on the dynamic system. A code portion may contain one or more code parts that are associated with tasks and/or interrupts defined in a specified model 102. A specified model can also specify attributes associated with the code parts. At least some of the code parts, when implemented, may execute concurrently and independently as computational threads on a same piece of hardware when deployed in a dynamic system. In some implementations, a computational thread, also referred to as a thread, comprises a sequence of programming instructions that carries out a predefined functionality. The sequence can be handled independently by a scheduler for execution on a processor. For example, a thread can have an identifier that is used to call for execution of the thread on the processor. A thread can execute concurrently (e.g., in a time-multiplexed manner) with other threads on a same processor or on different processors, and can share or use different memory, variables, and/or address space with the other threads. One or more threads may execute as part of a larger computing process. For example, a larger computing process might be estimating a current mileage range for a vehicle. This process may include a "fuel-reserve" thread that repeatedly executes to determine an amount of fuel remaining in the vehicle's fuel tank. The process may also include a "consumption-rate" thread that executes concurrently with the fuel-reserve thread. The consumption-rate thread may determine a rate of fuel consumption from sensor data or vehicle speed, for example. Data values written to a shared memory space or different memory spaces by the two threads can be used by the mileage-range process to calculate a distance that the vehicle could travel before running out of fuel.

A programmer developing implementation code from the specified model for a dynamic system must address additional levels of conformity for the implementation code. In addition to writing code that is free of syntax errors and runtime defects (e.g., division by zero, stack overflow, assertion failures, exceptions, non-initialized pointers, etc.), the programmer must prepare code that will comply with the specified model and conform with the dictates of the system-build guidelines when executed. Although standard code compilers may catch some runtime defects, compilers have no knowledge of complete system-build guidelines or specified model, and therefore are incapable of determining whether the code is free of defects relating to at least the specified model. Standard compilers also cannot determine whether parts of code that execute concurrently will execute without defect. Since the code base can be very large for complex dynamic systems, the task of checking the implementation code for defect-free execution is insurmountable for a programmer. Failure of the code during system operation may be unacceptable and result in unsafe operation of machines that generate large forces. Post-deployment code debugging may not be an option.

In overview and referring to FIG. 1, the described embodiments relate to a code-checking system 100 that can perform automated analysis of complex implementation code 104 (e.g., about a million lines of code) in reasonable amounts of time (e.g., tens of minutes or less), wherein the implementation code can include multiple tasks or processes that execute concurrently on one or more processors of a dynamic system. Even larger amounts of implementation code 104 can be analyzed by the code-checking system 100. The code-checking system can, among other things, quickly and visually identify to a user where in the implementation code mismatches occur between the implementation code 104 and specified model 102, identify sources of bugs and/or runtime errors relating to concurrent and non-concurrent execution of code parts, for example. In some cases, a code-checking system can identify the presence or absence of defects (e.g., perform code proving functionality), and may additionally identify a cause for each detected defect.

In embodiments, a code-checking system 100 can perform static code analysis of segments of implementation code 104. Static analysis can include using formal methods to perform one or any combination of semantic analysis, abstract interpretation, model checking, and satisfiability solving to verify software interprocedural, control, and data flow behavior. At least some code parts within the implementation code 104 comprise computational threads that can execute concurrently when deployed on a dynamic system. Concurrent computational threads can correspond to tasks and ISRs that are intended to execute concurrently on a processor in the dynamic system. For example, a concurrent thread can comprise a sequence of instructions that can be independently managed by an operating system scheduler for the processor on which the thread executes concurrently with other computational threads. The code-checking system 100 can perform code-checking functionality relating to concurrent execution (also referred to as multitasking) of the computational threads, and can additionally check for runtime defects. A code-checking system 100 can comprise a specially-adapted data-processing system 110 that is in communication with input/output devices such as a display 191, on which a graphical user interface can be rendered, keyboard 162, and mouse (not shown). In some embodiments, the display 191 can comprise a touch-screen display and a keyboard 162 may not be present. The code-checking system 100 can include a code checker 106 that executes on the data-processing system 110.

In embodiments, the data-processing system 110 is adapted to receive a specified model 102 that, among other things, identifies one or more functionalities to be performed by at least a portion of a system-control code which is to provide automated or semi-automated control of a dynamic system, such as any one of the dynamic systems described above. The received specified model 102 can be a portion or all of a complete specified model prepared for a dynamic system. The data-processing system 110 can further receive intermediate code (depicted in FIG. 3) and/or implementation code 104 that was prepared by a programmer to execute functionality of the specified model 102. In some cases, the data-processing system 110 also receives information or is programmed with information about one or more parts of a meta-model 101 that is relevant to the specified model 102. The meta-model 101 data can include information about a language and syntax used to form the specified model 102.

Figure 2:
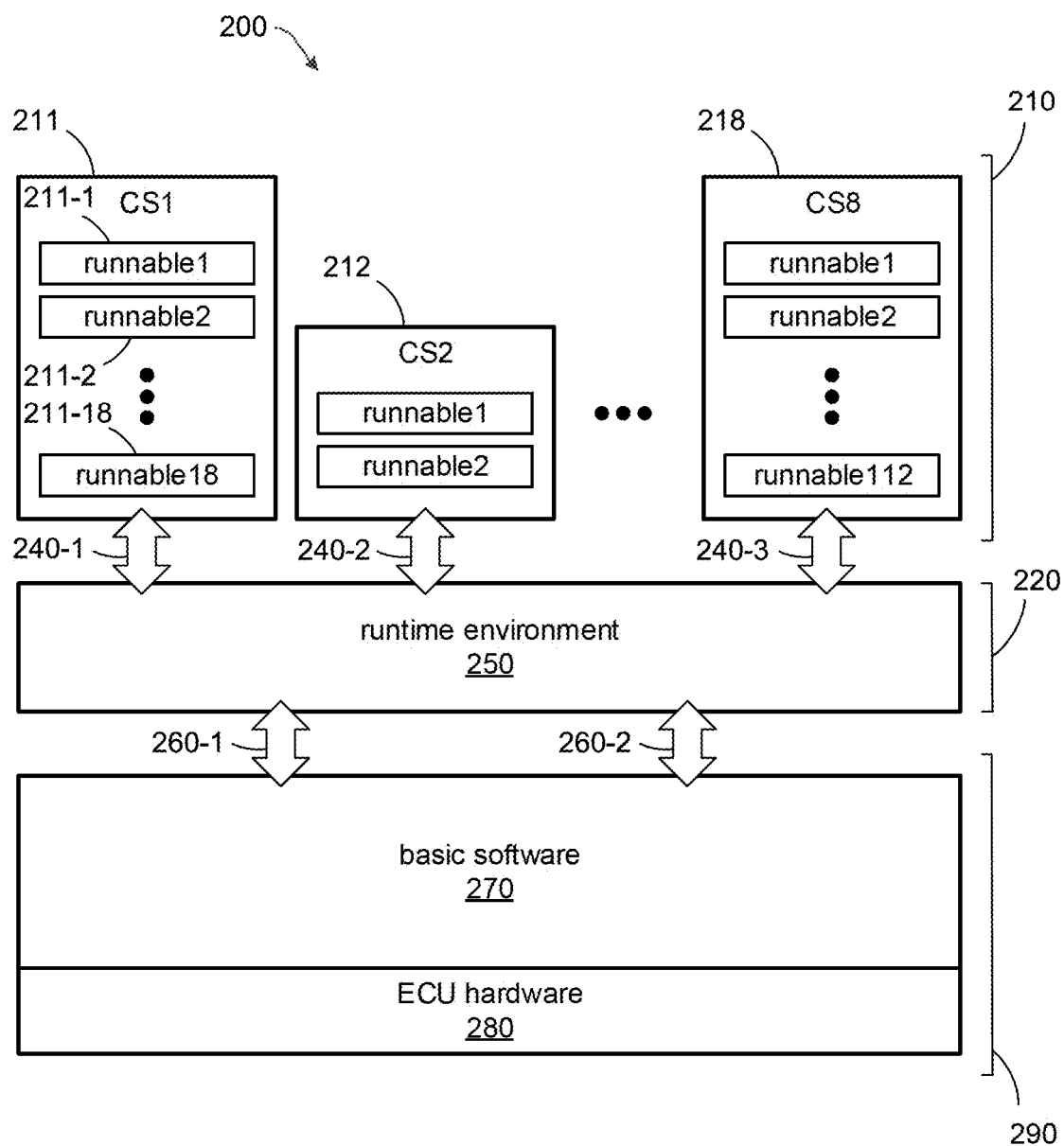
FIG. 2 depicts an example of a multi-layered architecture that can include concurrent tasks, interrupt service routines, and resources.

The data-processing system 110 can further receive information or is programmed with information about style guidelines 107 and/or standards that are used with the meta-model 101, for example, when preparing the specified model 102. Example style guidelines can include, but are not limited to, formatting of the specified model 102, schema that may be used to prepare at least portions of a specified model 102, file organization guidelines, and file naming conventions. Style guidelines 107 can also include Control Algorithm Modelling Guidelines for MATLAB®, Simulink®, Stateflow® and Embedded Coder® software packages. The Guidelines are hosted by The MathWorks, Inc. of Natick, Mass. and developed in collaboration with representatives of the automotive industry. Examples of recent Control Algorithm Modelling Guidelines can be found in "Control Algorithm Modelling Guidelines Using MATLAB®, Simulink®, and Stateflow®, Version 3.0," which is incorporated herein by reference and available at www-.mathworks.com/solutions/automotive/standards/maab.html on Feb. 13, 2018. Style guidelines 107 can also include information from industry standard guidelines such as IEC 61508 and its derivatives, ISO 26262, and MISRA C. The data-processing system 110 can further receive information or is programmed with information about a software architecture specification 108. Software architecture specification 108 data can include information about a software architecture (an example of which is depicted in FIG. 2) on which implementation code 104 may be executed. Information (such as meta-model 101 information, style guidelines 107, and software architecture specification 108) received by the data-processing system may be collectively referred to herein as system-build guidelines.

In embodiments, at least the specified model 102 and implementation code 104 can be provided to a code checker 106 that can perform at least static code analysis of segments of the implementation code 104 as described further in European Patent Application No. 17290155.5, filed Nov. 30, 2017 and titled "Systems and Methods for Evaluating Compliance of Implementation Code with a Software Architecture Specification," which is incorporated herein by reference in its entirety. The code checker 106 can comprise programming instructions executing on hardware of the data-processing system 110 comprising logic gates and registers arranged as sequential logic circuits. Example programming instructions that can be adapted for use as part of a code checker 106 in the code-checking system 100 is the Polyspace Code Checker™ software available from The MathWorks, Inc. of Natick, Mass.

As a further example of a specified model 102 and related implementation code 104, a specified model prepared for an automotive system can define functionalities associated with control of a vehicle's engine (e.g., fuel injection, air intake, revolution speed monitoring, temperature, etc.). The specified model 102 can be prepared by an automotive system designer, for example. In embodiments, the specified model 102 can comprise one or more data structures (e.g., one or more files) prepared manually according to a schema defined by the software architecture specification 108, for example.

The implementation code 104 can be corresponding software code developed to deploy on the physical system to implement the desired functionalities for engine control, following the automotive example above, and may be prepared by an entity other than the entity that prepared the specified model 102. For example, preparation of the implementation code 104 may be done by a programmer at the request of an engineer or system designer who developed the specified model 102. The implementation code, and any intermediate code if produced, can include hand-written portions, and may include portions automatically produced from the specified model 102, (e.g., using a code-preparation tool such as DaVinci Developer, available from Vector Informatik GmbH of Stuttgart, Germany or Embedded Coder® available from The MathWorks, Inc. of Natick, Mass.). In some cases, the implementation code may be prepared in whole or in part using automated code generation. In some cases, at least a portion of the implementation code 104 may be code generated in a technical computing environment such as code generated from a graphical programming environment such as the Simulink environment available from The MathWorks, Inc. of Natick, Mass. In additional embodiments, the implementation code 104 comprises legacy code that was produced in accordance with an earlier version of a specified model and/or under constraints imposed by a prior version of system-build guidelines, for example.

For safety considerations, it may be desirable to check the implementation code 104 for defects quickly and accurately during or after development but before deployment on the target system. If the implementation code 104 is not adequately checked prior to launch, a technical result may be improper operation of the executable code potentially creating an unsafe situation for a machine controlled by the code.

The implementation code 104 may be written in one language or may comprise files written in multiple different languages. Exemplary languages include, but are not limited to, C, C++, C #, assembly code, Java, Ada, structured text for execution on a programmable logic controller (PLC), and hardware description language (HDL). In some cases, the implementation code 104 may be encrypted when received for proprietary and/or security reasons and subsequently decrypted by the code-checking system 100 for analysis. A user or customer would provide a key for decryption of encrypted implementation code.

During and/or after analysis of the implementation code 104 by the code-checking system 100, information about the analysis can be provided for display. The information about the analysis can be rendered in one or more graphical user interfaces 180 on a display 191, for example, as depicted generally in FIG. 1. Other display arrangements can be used in other embodiments to convey results from the code checker 106. As only one example, several panels can be displayed on one user interface 180 that summarize and/or provide details about the presence or absence of defects in the implementation code, as well as provide information relevant to multitasking analysis of the implementation code 104. A user interface 180 can include a menu bar 121 for navigating to and selecting different functionality of the code-checking system 100. The user interface 180 can include a summary panel 123 that provides a brief synopsis of the analyzed implementation code, a details panel 125 that provides information about system-build guidelines or specified model or coding violation, a model panel 127 that provides further explanatory information about the portion of the system-build guidelines or specified model 102 that is relevant to the violation, and a source code panel 129 that displays a section of source implementation code 104 containing the violating code line or section. More detailed examples of user interfaces are described below in connection with FIG. 15 through FIG. 18. Such user interfaces 180 can provide a readily-comprehensible summary of code-checking results, a facile navigation tool, and helpful visual indications relevant to each defect and its causes. For example, displayed text and information can show a link between a code line or section containing or not containing a defect, a corresponding model part from the specified model 102, and optionally corresponding system-build guidelines. Such visual cues can aid a programmer in rapidly reviewing, checking, and revising the implementation code 104 (and specified model 102 if necessary) to remove any errors or runtime defects from the implementation code 104.

To further explain the complexity of code checking for code deployed on dynamic systems and further explain aspects of the present invention, reference is now made to FIG. 2. In embodiments, hardware and software for controlling a dynamic system or computing system can be implemented in a multi-layer architecture, as depicted in the drawing. Generally, a lower level of the architecture, referred to herein as a basic services layer 290, can comprise hardware and basic software service for interfacing with and controlling the system hardware and any peripherals. Basic software services can include routines for handling interrupts during code execution on hardware components. Code developed for the basic services layer 290 can comprise machine code, for example.

An upper layer of the architecture, referred to herein as the application layer 210, can comprise software code developed by programmers that provides higher level system control according to functionalities defined in the software code. Software in the application layer 210 can provide one or more interfaces for a user of the system. In some cases, an interface can be provided in part as an on-board diagnostic (OBD) port that can be accessed via a hardware multi-pin connector for system diagnostics. Software developed for the application layer 210 can comprise computer code prepared using widely-known programming languages, such as but not limited to C, C++, Java, and Python, for example.

An intermediate layer 220 provides interfacing between applications executing in the application layer 210 and operations performed in the basic services layer 290. The intermediate layer 220 may correspond to an operating system in a conventional computing system, for example. Generally, the intermediate layer 220 manages and dispatches tasks or processes to the basic services layer 290 in response to functions, methods, or subroutines executing in the application layer 210 and receives data from the basic services layer 290 that may be provided to one or more applications executing in the application layer 290. Embodiments of the present invention relating to automation of code-checking analysis are applicable to dynamic systems and computing systems having multi-layer architectures as described above in connection with FIG. 2 and for which system-build guidelines are available to the code-checking system 100, as described in connection with FIG. 1.

In further detail, FIG. 2 represents a three-layered software architecture 200 that is specific to AUTOSAR for implementing a system-control code. The AUTOSAR architecture will be used for explaining aspects of the invention, but the invention is not limited to AUTOSAR. As just one example of a software architecture specification, the AUTOSAR three-layered architecture 200 comprises an application layer 210, a runtime environment 250, and a basic services layer 290. For AUTOSAR, the application layer comprises a number of software components 211, 212, 218 that each comprise functionalities for accessing components (e.g., electronic control units (ECUs) 280 and/or sensors) in the basic services layer of an automotive system. Each software component 211, 212, 218 can be associated with a number of executable functions or runnables. In embodiments, the behavior of the software components is defined in the specified model 102 that can be analyzed according to the present embodiments to identify tasks, ISRs, resources, and associated attributes. The tasks, for example, can be associated with the executable functions or runnables and can run concurrently in a dynamic system. A task or ISR can be implemented as a part or subset of implementation code 104 (e.g., a computational thread within the implementation code) that is directed to implementing functionality of the task as defined in the specified model 102. Identification of a part of implementation code 104 associated with a task can be determined from an identifier in the implementation code 104 that can be traced to an identifier for a corresponding task definition provided in the specified model 102 using methodology described herein. A task can comprise one or more runnables. A runnable can be a callable sequence of instructions.

A runtime environment 250 for a multi-layered architecture can comprise code that is prepared based on knowledge of code in adjacent or other layers of the software architecture. For AUTOSAR the runtime environment 250 is produced, at least in part, from knowledge of the software components 211, 212, 218 in the application layer 210 and from knowledge of basic software 270 and ECUs 280 in the basic services layer 290. An AUTOSAR runtime environment 250 can include code that is produced in accordance with a methodology specified by the AUTOSAR system-build guidelines.

An AUTOSAR runtime environment 250 can provide an interface between software components in the application layer and services in the basic services layer 290. The runtime environment 250 can interact with software components in the application layer 210 through software interfaces 240-1, 240-2, 240-3 (referred to generally as interfaces 240). The runtime environment 250 can also interact with the basic software 270 through interfaces 260-1, 260-2. The interfaces can comprise data ports (e.g., addressable sections in one or more data storage elements) through which information is exchanged between the different layers of the three-layered architecture 200 as well as between software components. In this manner, functionality defined by the software components 211, 212, 218 can be implemented (e.g., using one or more of tasks (which can include one or more runnables), ISRs, and resources) on underlying electronic control unit (ECU) hardware 280 in the basic services layer 290 without a programmer having to know the particular details about coding for the ECU hardware 280.

Continuing with the AUTOSAR example, the runtime environment 250 can participate in the execution of software components 211, 212, 218 in the application layer 210 and their runnables 211-1, 211-2, . . . 211-18. For example, an operating system executing in the basic software layer 270 and accessing the runtime environment 250 can detect data present and/or place data at one or more interfaces 240 of the runtime environment and cause invocation by the runtime environment of a runnable of a software component. In some cases, certain runnables can be invoked routinely by the runtime environment 250 based only on elapsed time. For example, the runtime environment can cyclically invoke a "speed" runnable to retrieve speed data posted to a data port of an interface associated with a speed sensor. In some implementations, sequences of runnables can be invoked in accordance with an allowed sequence specified by the specified model 102 and/or permitted by the software architecture specification 108.

Although AUTOSAR is described herein as an example software architecture specification to which the described embodiments can be applied, the embodiments are not limited only to AUTOSAR. Exemplary embodiments may also be implemented with other software architecture specifications, such as Unified Modeling Language (UML), Systems Modeling Language (SysML), guidelines developed by the Motor Industry Software Reliability Association (MISRA), Common Object Request Broker Architecture (CORBA), real-time CORBA, Advanced Architecture Description Language (AADL), Software Communication Architecture, Modeling and Analysis of Real-Time and Embedded systems (MARTE), ARINC Standards published by Aeronautical Radio, Incorporated of Cedar Rapids, Iowa, and Assembly Line Diagnostic Link (ALDL) among others. System-build guidelines for each of these software architecture specifications can dictate how corresponding specified models 102 are formed for the different software architectures, and may further dictate how at least some of the implementation code 104 is structured to comply with the specified model and, in some cases, with the system-build guidelines. Embodiments relating to code-checking may be applied to software architecture specifications other than AUTOSAR that may require single-layer or multi-layer software architectures having fewer or more than three layers.

Checking implementation code 104 associated with a software architecture (like that depicted in FIG. 2) for defects can be complicated even without the presence of computational threads that can execute concurrently. Concurrent threads can correspond to tasks and interrupt service routines (ISRs) that execute on an ECU within the dynamic system. In embodiments, a task or ISR can utilize resources (e.g., software objects) when executing, though a resource may be taken by only one executing thread at a time but can be shared among different tasks and ISRs at different times. In embodiments, a resource can include data and/or code pieces that may be accessed and/or used for execution of implementation code. Tasks and/or ISRs that execute concurrently in a dynamic system may be a portion of the total tasks and/or ISRs that execute in the dynamic system. For example, a first group of tasks and/or ISRs that execute concurrently can be assigned in the implementation code 104 to execute on a same processor of the dynamic system. There can be other tasks and ISRs in the implementation code assigned to other processors. Since the other tasks and ISRs are assigned to execute on other processors, they will not execute concurrently on the same processor as the first group of tasks and/or ISRs. In some cases, concurrent tasks and ISRs may be included in a list of tasks and ISRs that are schedulable items for execution on a processor.

Because of the presence of computational threads that can execute concurrently in the implementation code 104, multitasking analysis of the code is more difficult than analysis of code that does not contain concurrent threads. When there are concurrent threads in such a system, it is not known beforehand which threads will execute when since invocation of a thread can depend upon the state of the dynamic system, as explained further below. Accordingly, information about the concurrent threads (e.g., whether a thread can be suspended, what type of occurrence initiates a thread, etc.) can be detected from the specified model 102 and provided to the code-checking system 100 to improve the accuracy of code analysis by the code-checking system 100 according to the present embodiments. For example, without information relevant to thread concurrency, a code-checking system 100 can analyze a thread code and find it free of runtime defects and standard coding violations relevant to the software architecture. However, when executing in a concurrent manner with other threads, the thread can enter a waiting state for data at an interface's data port that can never appear, for example, or never be invoked due to no appearance of a correct type of invoking occurrence, for example. Such defects may go undetected by conventional static code analysis. However, when the code-checking system 100 receives knowledge of the threads attributes, it can detect the presence or absence of defects in concurrent thread invocation and execution sequences.

Figure 3:
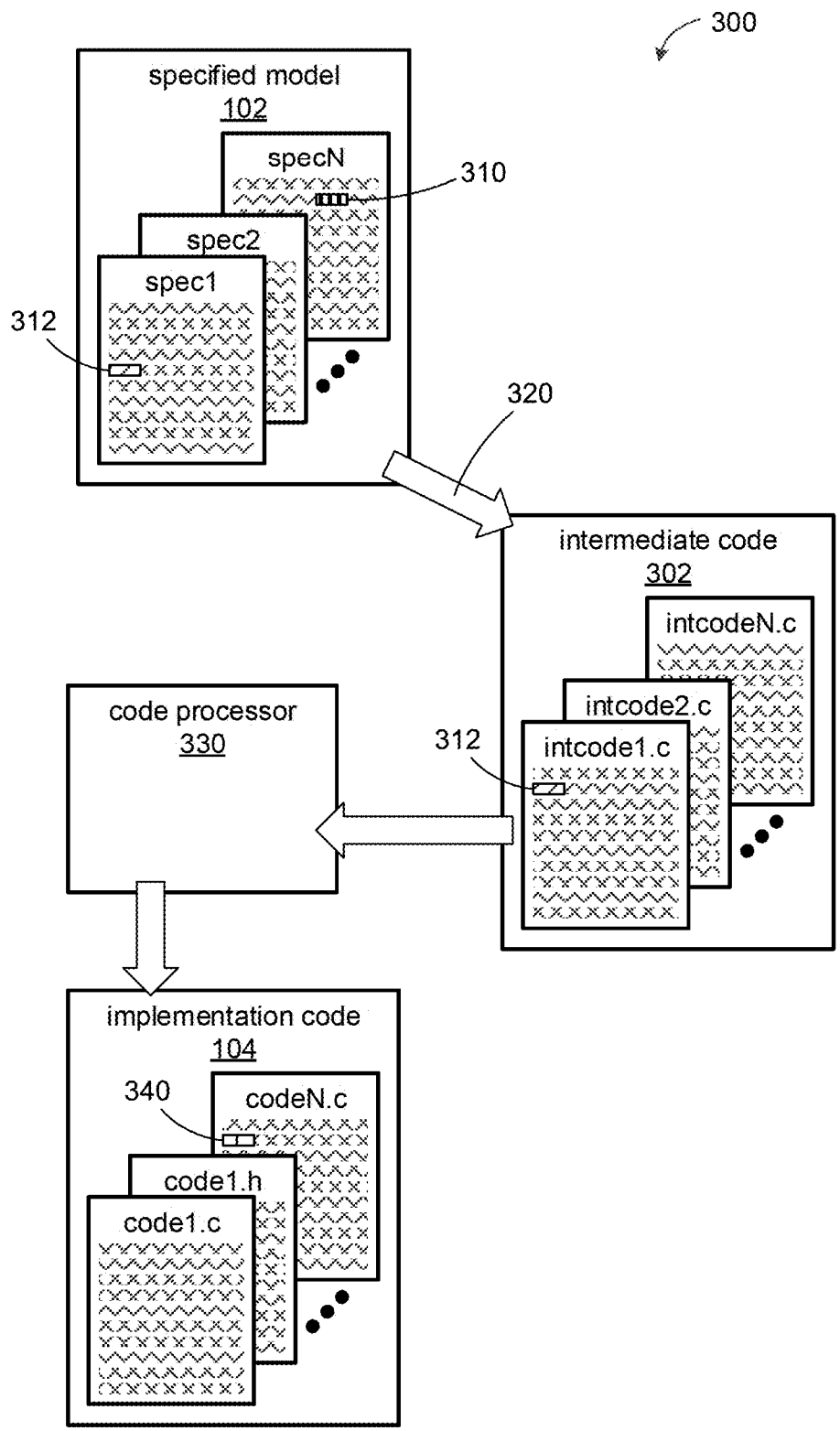
FIG. 3 depicts an example of preparation of implementation code from a specified model, according to some embodiments.

FIG. 3 is a simplified and high-level depiction of an example of a methodology 300 for transforming a specified model 102 into implementation code 104. Methodology 300 used to transform the specified model into implementation code can comprise, at least in part, standardized code-preparation methodology that is dictated, at least in part, by system-build guidelines. At a high level, a specified model 102, which may have been written by one or more system developers, can be subjected to a first implementation process 320 in which, for the illustrated example, intermediate code 302 is created. The intermediate code 302 can comprise one or more files containing at least some computer code (e.g., C++ or C code as depicted in FIG. 3). Additional computer code that can be present in intermediated code 302 includes, but is not limited to Ada, Basic, C #, FORTRAN, assembly code, and Hardware Description Language (HDL) code, such as VHDL, Verilog, or SystemC, among others. In some cases, an automated tool (such as DaVinci Developer, available from Vector Informatik GmbH of Stuttgart, Germany) can be used to assist in the preparation of the intermediate code 302. The first implementation process 320 can also comprise direct coding by one or more human code implementers. Subsequently, the intermediate code 302 can be subjected to automated code production by a code processor 330 (which may also be referred to as a preprocessor) that results in the implementation code 104. The code processor 330 may not be a standardized code processor, but can generate or produce the implementation code 104 in accordance with constraints imposed by the specified model 102 and constraints imposed by the corresponding system-build guidelines. In some cases, the methodology of producing implementation code 104 can include multiple steps of preparing intermediate code and/or intermediate data structures in a build process before arriving at the implementation code 104. Some of these steps can include building intermediate code and/or data structures based on information about the basic services layer 290, for example.

In some cases, the code preparation methodology 300 can comprise one or more code preparation steps, for which one or more intermediate codes, or sets of intermediate code instructions, (not shown) are produced before arriving at the final implementation code 104. Each intermediate code can be based in part on additional information relevant to the dynamic system, such as system configuration information and ECU configurations. Other methodologies may not include intermediate code preparation. Instead automated or semi-automated code preparation that assists a code implementer can be carried out to prepare implementation code 104 directly from a specified model 102.

The inventor has recognized and appreciated that a technical problem can arise when attempting to analyze implementation code 104 that has been produced according to such code preparation methodologies. The technical problem relates to the way in which executable functions associated with tasks, ISRs, and resources are implemented in the implementation code 104. In brief, at least some of the executable functions can be defined in a specified model 102 as one or more different types of tasks and/or ISRs (which may include at least one resource) that are to run concurrently on a single-core or multi-core processor (or in some cases on multiple processors) of a dynamic system. Each task, ISR, and resource can be given a name in the specified model 102 and associated attributes. Attributes of a task, ISR, and resource can affect concurrent execution of the corresponding computational thread when executed on a target device of a dynamic system. According to some software architecture specifications 108, only one task or ISR can execute on a single target processor (of an ECU, for example) at any given time. In a complex automotive system, for example, there can be tens or hundreds of tasks, for example, running concurrently on a processor. Accordingly, a code checker 106 needs to know at least some information about task, ISR, and resource attributes so that it can check segments of the implementation code 104 containing concurrent threads for the presence or absence of defects relating to concurrent thread execution.

A problem recognized by the inventor is that the implementation code 104 alone does not contain sufficient information to determine the attributes of a task, ISR, or resource that is present in the form of an implemented, independent code thread or code part that can be or is to be executed concurrently with other independent code threads or code parts. Additionally, in some cases an identifier for the implemented code thread or implemented resource does not match an identifier for the corresponding task, ISR, or resource in the specified model 102. This can occur when preparing the specified model 102 and implementation code 104 and may also be due to a code preparation methodology 300 like that described in FIG. 3.

Information that can be useful to a code-checking system for multitasking code analysis includes a portion or all of the following types of information for computational threads that can execute concurrently on hardware of a dynamic system: task identities, corresponding task attributes, events and alarms that may trigger the corresponding tasks, related resources that may be used by the tasks, ISR identities, corresponding ISR attributes, resource identities, and corresponding resource attributes. One way to provide information to the code checker 106 is to manually analyze the specified model 102, any intermediate code prepared by the code preparation methodology 300, and implementation code 104 to determine the relevant information and then configure the code-checking system 100 by entering the relevant information for each relevant implemented code thread in the implementation code 104 via a graphical user interface 180, for example. For small amounts of implementation code (e.g., less than 1000 lines), this approach may result in correct configuration of the code-checking system 100, but is prone to error and is time consuming.

The inventor has recognized and appreciated that errors can, and typically do arise even for such small amounts of implementation code as a result of manual configuration and that the process can consume substantial amounts of time. Errors can result from the way in which the specified model is prepared, as well as from a code preparation methodology 300 in which there can be used two or more different names for a same task, so that attributes for a task specified in the specified model 102 are not correctly associated with the corresponding implemented code thread in the implementation code 104.

As an example of using different names for a same task during a code preparation methodology 300 (referring again to FIG. 3), a task can have a first name or identifier 310 defined at a first location in the specified model 102. The first location in the specified model 102 can be a first delineated data structure (e.g., a group of entries within a data file, a container for an AUTOSAR ARXML file, a plurality of entries between complementary tags in a mark-up language file, etc.) A second location in the same specified model can use a second identifier 312 for the same task that is different from the first identifier 310. In some cases, the second identifier 312 can be used in the intermediate code 302. To further complicate matters, a third identifier 340, different from the second identifier, can be used for the corresponding implemented code thread in the implementation code 104 as a result of action of the code processor 330. The problem of correctly identifying tasks, ISRs, resources and their attributes is compounded when relevant information for these items are distributed across multiple disjoint locations in one or more data structures (e.g., one or more files) of the specified model 102, as is the case for AUTOSAR. However, the problem of using different names for a same task or process is not limited to AUTOSAR. The use of different names for tasks and processes can occur in other specified models that may be implemented with other software architectures. In other specified models, processes (callable sequences of instructions such as functions and subroutines) may be used instead of or in addition to tasks. The problem of correctly associating task, ISR, and resource attributes with their corresponding implemented code threads can become insurmountable when there are hundreds or thousands of files with millions of entries for the specified model 102 and millions of lines of corresponding implementation code 104 in thousands of files.

To aid in explaining the present embodiments, further details of a specified model 102, tasks, ISRs, resources and implementation code 104 are now provided. In embodiments, a specified model 102 can comprise one or more data structures (e.g., files spec1, spec2, specN shown in FIG. 3) that define, among other things, functionality of one or more implementation code segments that can be developed from the specified model. The specified model 102 can be prepared by a systems engineer who designs alone, or in collaboration with others, system-control code for a dynamic system. A specified model 102 can be prepared in any suitable manner, for example, by direct coding or by filling out templates that guide the writing of a specified model. As one example, templates are available for AUTOSAR that can be filled out to produce one or more AUTOSAR extensive mark-up language (ARXML) files for a specified model 102. A specified model 102 can be prepared to comply with system-build guidelines that can place constraints on how the specified model 102 is formed (e.g., define a schema for the specified model).

A specified model 102 can also include information about executable functions, interfaces, ports, ISRs, tasks, resources, and their attributes that one or more implementation code portions, produced from the specified model, use to execute functionality and interact with other code segments executing in the dynamic system. Attributes associated with a task can identify a type of task and/or a type of occurrence that activates a task. For example, some software architecture specifications such as AUTOSAR and OSEK provide for two types of tasks that can each be given a priority value: a basic task and an extended task. A basic task, once activated, normally executes through to completion, though it can be suspended, e.g., by an ISR or task with higher priority. A basic task, once activated, cannot enter a wait state in which it waits for an event to complete its execution. An extended task, once activated, can enter a wait state (e.g., wait upon receipt of data) as well as be suspended by ISRs and tasks with higher priority. Tasks and ISRs can be assigned priority values in the specified model 102, which determine an execution order of two competing tasks or ISRs. In embodiments, information about task, resource, and ISR identifiers and associated task, resource, and ISR attributes can be determined at least in part from the specified model 102.

In embodiments, there can be different types of ISRs that can execute in a dynamic system. A first type of ISR can cause any executing task on a processor to suspend while the ISR completes its execution on the processor. After completion of the first type of ISR, the executing task can resume where it left off. A second type of ISR can also cause an executing task on a processor to suspend. However, the second type of ISR can issue a system call, so that when the ISR completes execution a switching task may occur if a higher priority task than the currently-suspended task becomes active during the system call. In embodiments, ISRs can be hardware-initiated.

Items that can cause activation of a task can include alarms and events. An alarm can be a cyclic alarm that is associated with a recurring incident in a dynamic system or a single alarm that is associated with a single incident in a dynamic system. In some cases, alarms can be associated with electrical or mechanical incidents in an electro-mechanical system (e.g., triggered by hardware incidents). For example, a repeating incident for a cyclic alarm can be a number of engine revolutions in an automobile (e.g., every 5,000 revolutions), and the cyclic alarm can be triggered after each 5,000 revolutions. A single incident for a single alarm can be a key-initiated start-up of the engine, for example, and the single alarm can be triggered after the key-initiated start-up. In some cases, alarms can be triggered by software incidents. For example, an alarm can be triggered by a counter that counts a number of times a certain task has been executed.

Activation of a task based on an event can comprise a change in state at a data port associated with the task, for example, such as the appearance of data at a port of an interface. In some cases, the data can appear at a port as a result of a new reading from a sensor, so that the event is initiated by a hardware incident. For example, data that appears at a port associated with a sensor can cause activation of one or more tasks that receive the data and processes the data. In some cases, the data can appear at a port as a result of an internal computation by the dynamic system, so that the event is triggered by software. There can be various types of events that cause activation of tasks, such as, but not limited to timing events, error events, completion of data sending, server call, and mode switch events.

When implementation code 104 is prepared from a specified model 102 in accordance with a code preparation methodology 300, it is desirable to at least know, for purposes of accurate multitasking code analysis, what concurrency elements (e.g., tasks, ISRs, and resources) are present in the implementation code 104 and also to know attribute information about the concurrency elements present. Correct information about the concurrency elements can be used by the code checker 106 to evaluate, for example, scheduling and multitasking execution of corresponding implemented code threads. With the correct information, static code analysis can be performed by the code checker 106 to determine the presence or absence of defects relating to multitasking execution of tasks and ISRs in a dynamic system. As may be appreciated from the above description and further detailed description below, correctly identifying tasks and their related information in both the specified model and implementation code and correctly configuring a code-checking system 100 with the relevant information about tasks and ISRs that are intended to run concurrently is a technically challenging problem.

In some cases, the implementation code 104 can be analyzed by a code checker 106 to determine whether any concurrency elements identified in a specified model 102 are spooled during execution. Spooled concurrency elements may be restricted to execution one after another following completion of each previous concurrency element. In such a case, spooled concurrency elements will not execute concurrently. Such tasks, ISRs, and routines that do not execute concurrently can be tagged or otherwise designated as non-concurrent elements. Non-concurrent elements can be indicated to the code checker 106 prior to performing static code analysis to determine the presence or absence of defects in the implementation code 104. Knowledge of non-concurrent tasks, ISRs, and routines can improve the speed and accuracy of the code checker 106.

Figure 4A:
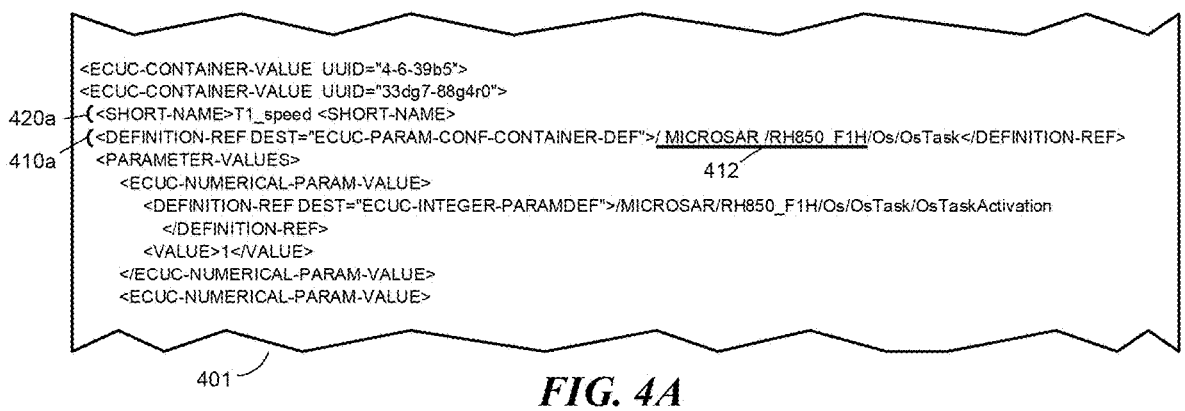
FIG. 4A illustrates an example of a portion of a specified model in which a task is defined and associated with a short name.
Figure 4B:
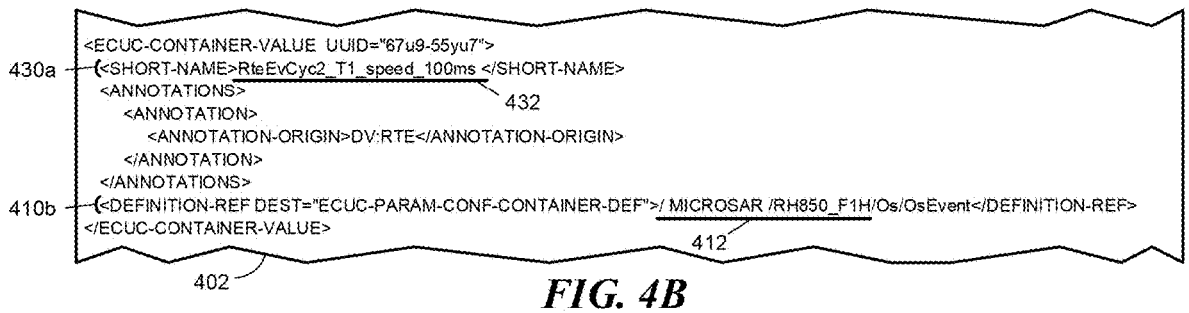
FIG. 4B illustrates an example of a portion of a specified model in which an event is defined for the task identified in FIG. 4A.

FIG. 4A through FIG. 4C depict portions 401, 402, 403 of an AUTOSAR specified model 102 that contain relevant entries from which a task, task type, and event associated with the task can be identified. The relevant entries of the specified model for identifying a task and its attributes can appear in disjoint data structures (e.g., different files) or at disjoint locations in a data structure of the specified model 102. In embodiments, a data analyzing tool (illustrated as item 1110 in FIG. 11 below) can analyze, e.g., parse, data structures of a specified model 102 to identify entries relevant for the identification of tasks, ISRs, resources and their associated attributes. The data analyzing tool 1110 can be implemented as programming instructions executing on hardware comprising logic gates and registers arranged as sequential logic circuits. The data analyzing tool can be programmed with or receive information from a software architecture specification 108 or style guidelines 107 about methodology (e.g., a schema) used to prepare a specified model 102, so that it can determine which entries in the specified model are relevant to tasks, ISRs, resources and their associated attributes.

Referring to FIG. 4A, a data analyzer 1110 can identify a first task-defining entry 410a in a specified model 102 based on some predetermined identifier (e.g., one or more character sequences) associated with the entry. In this example, the predetermined identifier comprises at least one extensible markup language (XML) tag that includes the text "DEFINITION-REF" along with a portion of entered text "Os/OsTask" located adjacent to the tag. Another portion of the entered text can include a task-definition identifier 412, "MICROSAR/RH850_F1H" in this example. Associated with the task definition, there can be a first identifier (also referred to as "short name") assigned to the task in a task-naming entry 420a, which can be recognized by a data analyzer based on its HTML tags, for example. In this example, the first identifier is "T1_speed" though another identifier may be used for a task in a task-naming entry 420a. In embodiments, the task-naming entry 420a can appear within a portion of the specified model 102 that includes the task-defining entry 410a (e.g., between the same complementary HTML tags, between enclosing brackets, etc). In this example, the two entries appear between complementary <ECUC-CONTAINER-VALUE> HTML tags, and the corresponding section of the specified model may be referred to as a "container."

According to some embodiments, a same section (e.g., container) of the specified model containing a task-defining entry 410a can include an identifier for a hardware resource on which the task can execute. According to the example of FIG. 4A, the task-definition identifier 412 can include an identifier for a microcontroller (RH850_F1H, for example) on which the task is to execute. In embodiments, a data analyzer 1110 can determine which tasks are potentially multitasking when their corresponding implemented code threads execute based on hardware resource identifying information associated with each task.

Using the task-definition identifier 412, the data analyzer can search the specified model 102 for another section of code (in this example, another section enclosed by ECUC-CONTAINER HTML tags) containing the same task-definition identifier 412. Another portion 402 of the specified model is shown in FIG. 4B. According to some implementations, the task-definition identifier 412 can be used elsewhere in the specified model 102 to define an event or alarm that is to be associated with the task for activating the task. For the example shown in FIG. 4B, the task-definition identifier 412 is used in an event-defining entry 410b to define an event that will activate the task. The event-defining entry 410b can be identified by the data analyzer, for example, by one or both HTML tags (e.g., containing "DEFINITION-REF") and a corresponding portion of enclosed, entered text (e.g., "Os/OsEvent"). An event-naming entry 430a can appear in the same portion 402 of the specified model 102 and identify a first identifier 432 for the event, in this example "RteEvCyc2_T1 speed 100 ms".

Once a first event identifier 432 has been determined from the event-naming entry 430a, the data analyzer can search the specified model 102 for another occurrence of the same event identifier. The first event identifier 432 can occur in a portion 403 of the specified model 102 in which an event is associated with the task, as illustrated in FIG. 4C. A portion 403 of the specified model containing the event-to-task mapping can be identified by the data analyzer as a section containing an event-to-task-mapping definition entry 440 and enclosed by ECUC-CONTAINER HTML tags, for example. An event-to-task-mapping entry 440 can be identified, for example, by one or both HTML tags (e.g., containing "DEFINITION-REF") and a corresponding portion of enclosed, entered text (e.g., "RteBswEventToTaskMapping"). The portion 403 can also include an event-naming entry 450 that provides a short name for the event that is to be mapped to the task. Within this portion of the specified model 102, there can be provided a second identifier 422 (also referred to as a "fully-qualified name") for the event in a first referencing entry 430b that includes the first event identifier 432. The same portion 403 of the specified model 102 can also include an associated second identifier (also referred to as a "fully-qualified name") for the task that was first defined in the first portion 401 of the specified model illustrated in FIG. 4A. The associated second identifier can appear in a second referencing entry 420b. For example, in this case the second identifier 422 for the task is shown as "/ActiveEcuC/Os/T1_speed 100 ms" which differs from the short name "T1_speed" provided for the task. Although in this example the second identifier 422 for the task includes the short name, in practice the second identifier 422 can be completely different from the task's short name provided in the task-naming entry 420a. The second identifier 422 for the task can be relevant to subsequent code preparation methodology 300, as described further below.

A data analyzer can determine from the event-to-task-mapping portion 403 of the specified model 102, along with information obtained from other portions 401, 402 of the specified model shown in FIG. 4A and FIG. 4B, several attributes of a task that is initially defined with a task-defining entry 410a. The data analyzer 1110 can determine that the task is activated by an event and identify the task type. In embodiments, a task that is activated by an event can enter a waiting state for the event and is an extended task type. The data analyzer 1110 can also determine an identifier for the event that is to be associated with the task for activating the task. The data analyzer 1110 can also determine a second identifier (fully-qualified name) for the task that is relevant for subsequent code preparation methodology. Accordingly, the data analyzer can store in memory and/or transmit information to a code-checking system 100 about the task and its attributes that is relevant to multitasking code analysis. The information can be received or accessed by the code-checking system 100 and used to automatically configure its code checker 106 to handle the corresponding implemented code thread for the particular task. Configuration of the code checker 106 can comprise at least identifying a task type (e.g., basic or extended) and task name for each task to the code checker 106.

In embodiments, a code-checking system 100 uses information (e.g., an identifier for a corresponding computational thread) about a task to search the implementation code 104 for the corresponding computational thread and analyze the thread. Without the identifier, the computational thread may not be analyzed and that part of the implementation code, which could contain defects, would not be checked. In some cases, attribute information can be used by the code-checking system 100 to improve analysis of the behavior of a computational thread. For example, a task that is invoked by or waits upon an event can be identified to the code-checking system 100 along with information about the event based on an analysis of the specified model 102. The code-checking system can then analyze the implementation code 104 to determine whether the event ever occurs and whether the task will ever be invoked or exit a waiting state.

A process for identifying tasks and their activating alarms can be different from the process for identifying tasks and their activating events. FIG. 5A depicts a portion 501 of a specified model 102 which includes a container, beginning with a container entry 510a (e.g., a recognizable tag <ECUC-CONTAINER-VALUE>, in which an alarm is defined. In embodiments, identifying a task and its activating alarm can begin with identifying a definition for an alarm and associating the definition to a task activated by the alarm.

As an example, an alarm definition can comprise a recognizable alarm-defining entry 510b that includes a key term 512 (e.g., "Os/OsAlarm") between definition tags (e.g., <DEFINITION-REF . . . >). With the same container bound by container entry 510a, there can be sub-containers 520a, 530a and additional definitions 520b, 530b, 530c relating to the alarm. A first sub-container 520a can include a definition 520b associated with an alarm action, and can be recognizable by a key term 522 (e.g., "Os/OsAlarm/OsAlarmAction") between definition tags.

The first sub-container 520a can include a second sub-container 530a in which a first definition 530b associated with task activation is present. The definition 530b associated with task activation can be recognized by a key term 532 (e.g., "Os/OsAlarm/OsAlarmActivateTask") located between definition tags. Within the same sub-container, there can be an identifying name 534 for a task that is activated by the alarm. The identifying name 534 can be recognizable as an entry between or associated with identifying tags (e.g., <VALUE-REF . . . >tags). In some cases, the identifying name 534 includes a prefix (e.g., /rtk_cpu/OsRTA/") followed by a task name (e.g., "OsTsk_Check- _Temp"). The task name may or may not be a same name that is used when first defining the task activated by the alarm.

Once the identifying name 534 is found, the data analyzer 1110 can search the specified model 102 for a second instance of the prefix of the identifying name 534. The second instance can occur in a different portion 502 of the specified model, which is illustrated in FIG. 5B. The second portion 502 may include the prefix 534*a* followed by a short name 552. The short name 552 can be used by the data analyzer 1110 to identify the original definition of the task that is activated by the alarm, which is illustrated in FIG. 5C. An original definition for the task can include a task-defining entry 540*b* that occurs within a container entry 540*a*. The task-defining entry can include a key term (e.g., "/Os/OsTask") that is recognized by the data analyzer 1110. A nearby short name entry 550 (e.g., within the same container) can provide the original short name 552 defined for the task. Accordingly, information about a format or schema used to form the specified model 102 and information about key terms used in the specified model can be used to identify tasks and their activating alarms or events.

Figure 6:
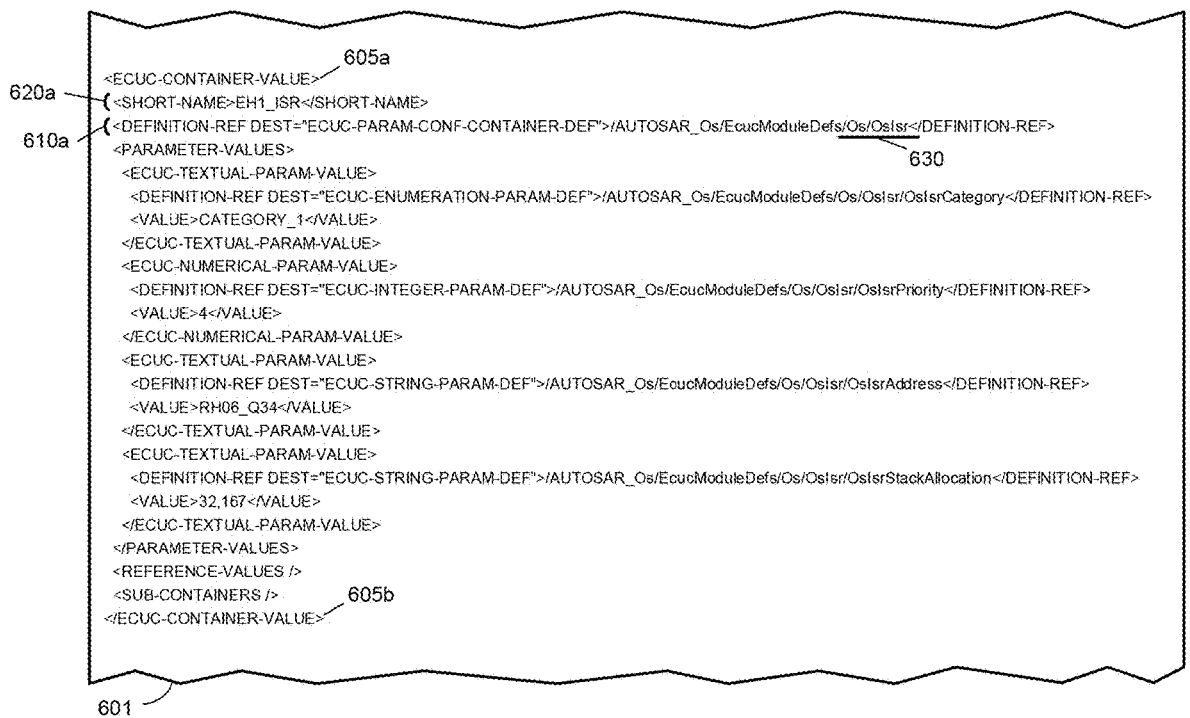
FIG. 6 illustrates an example of a portion of a specified model in which an interrupt service routine (ISR) is defined.

Interrupt service routines (ISRs) and software resources can also be identified from entries in a specified model 102. FIG. 6 depicts a model portion 601 of a specified model in which an ISR and at least some of its attributes are defined. An ISR can execute on a processor and respond to an interrupt that may be caused by a hardware or software incident that requires immediate attention (e.g., an operating system of an ECU in an automotive system issues and interrupt upon detecting a divide by zero condition). In embodiments, an ISR can be defined with an ISR-defining entry 610*a* that includes at least one recognizable key term 630 (e.g., an "Os/OsIsr" text entry between HTML definition tags <DEFINITION-REF . . . >). Other key terms and tags can be used in other embodiments. A short name entry 620*a* can be associated with the ISR in some cases. In embodiments, an ISR can be defined within a container that is indicated by container tags 605*a*, 605*b*. Attributes of an ISR can be defined within the container. In the illustrated example, defined attributes include a category of ISR (category 1), a priority value (4) for the ISR, an address and stack allocation for the ISR.

The identity of a corresponding computational thread in the implementation code for an ISR can be determined in a same manner as described below in connection with FIG. 9A through FIG. 9E for determining the identity of computational threads for tasks that are defined in the specified model 102. In some cases, all computational threads in the implementation code 104 that are identified as being associated with ISRs are identified to a code-checking system during configuration as being associated with interrupts. For example, when the Polyspace Code Checker™ software (modified with code as described in European Patent Application No. 17290155.5, filed Nov. 30, 2017 and titled "Systems and Methods for Evaluating Compliance of Implementation Code with a Software Architecture Specification") is used for code analysis, identification of an ISR can be used to cause automatic configuration of an "-interrupts" option for the corresponding implemented code thread for multitasking analysis.

Figure 7:
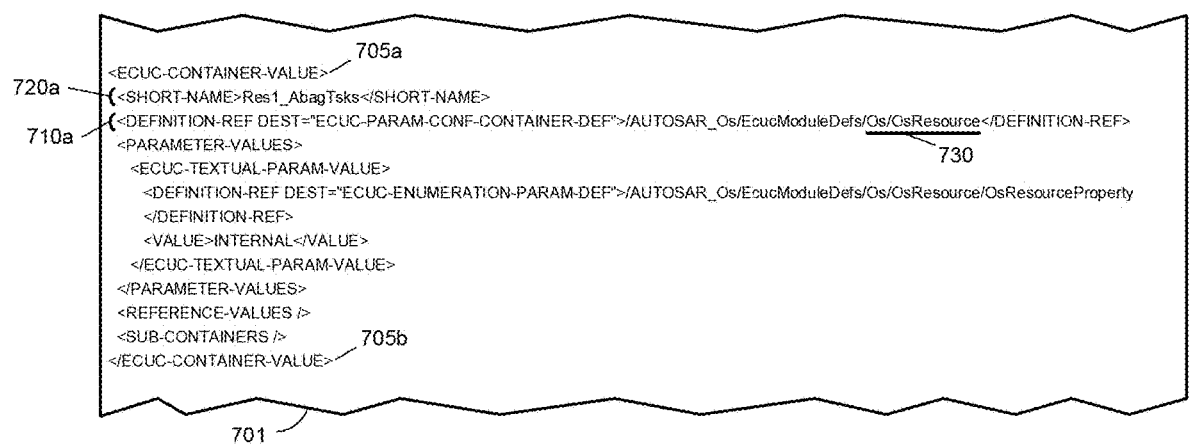
FIG. 7 illustrates an example of a portion of a specified model in which a resource is defined.

FIG. 7 depicts a model portion 701 of a specified model 102 in which a resource is defined. In embodiments, a resource can be a software object that is utilized by and shared among tasks and ISRs, though a resource can only be taken by one task or ISR at any given time. In some cases, a resource can include or be associated with a part of code containing a computational thread, so that the part of code is protected when executed within a task or ISR (e.g., no other task or ISR is permitted to access the executing code at the same time). A resource may be released by a task or ISR to make the resource available to other tasks and ISRs. In embodiments, a resource can be defined with a resource-defining entry 710*a* that includes at least one recognizable key term 730 (e.g., an "Os/OsResource" text entry between HTML definition tags <DEFINITION-REF . . . >). Other key terms and tags can be used in other embodiments. A short name entry 720*a* can be associated with the resource in some cases. In embodiments, a resource can be defined within a container that is indicated by container tags 705*a*, 705*b*. The identity of a corresponding implemented resource in the implementation code 104 for a resource can be determined in a manner as described below in connection with FIG. 10A and FIG. 10B.

Figure 8:
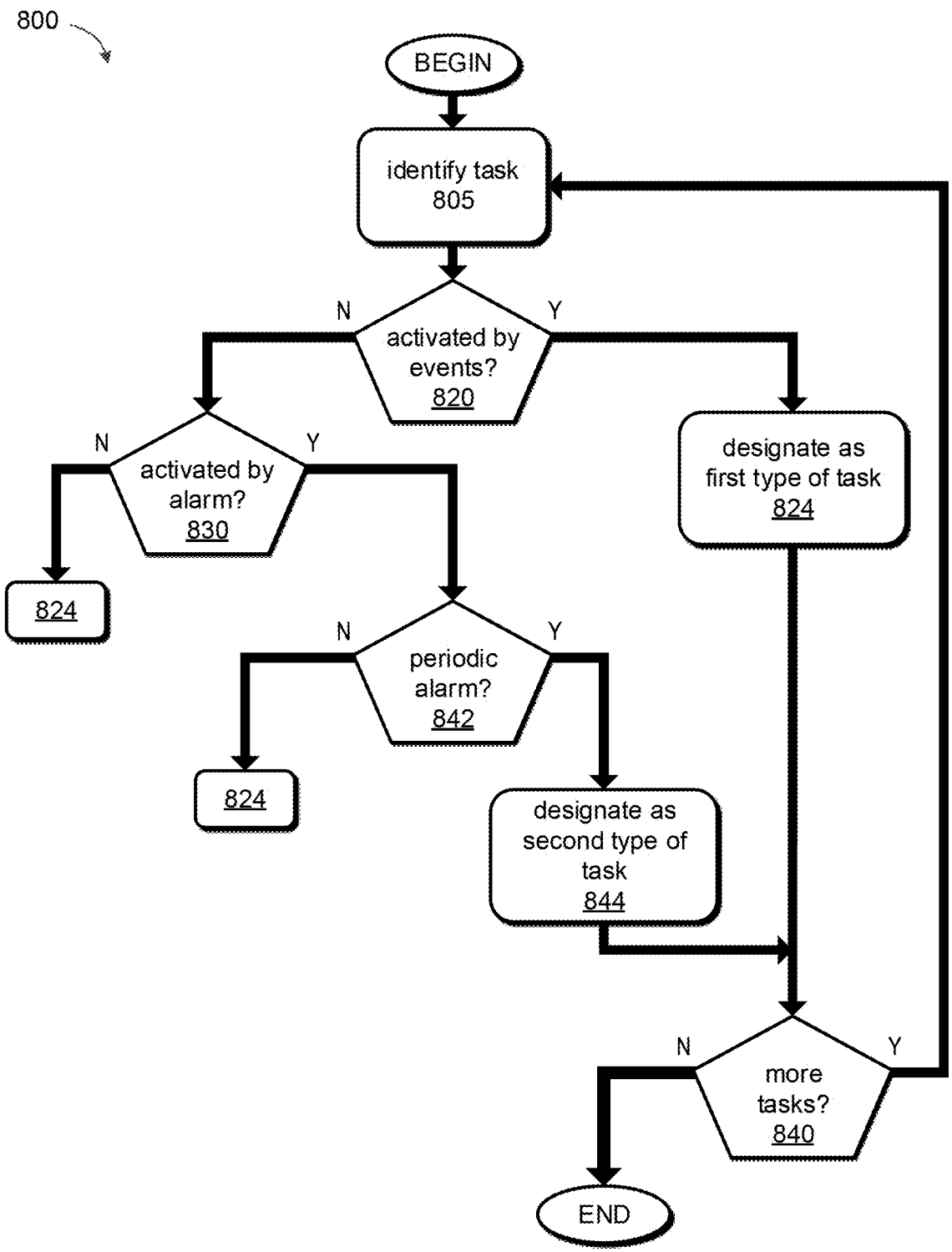
FIG. 8 illustrates an example process that can be used to identify types of tasks based on task attribute information discerned from one or more files of a specified model.

After identifying a task and its associated attributes (such as whether it is activated by an event or alarm and parameters or attributes of the activating event or alarm), the data analyzer 1110 can determine a designation for the task that can be provided for configuring the code-checking system for multitasking analysis of the implementation code 104. A designation for a task can include identifying a task type (e.g., categorizing the task or selecting a categorizing identifier for the task) and/or providing or storing information about the task (e.g., information about task attributes, such as information about an occurrence that activates a task). FIG. 8 shows an example decision algorithm 800 that a data analyzer 1110 or other analytic tool can implement to determine a designation for tasks identified from a specified model 102. In some cases, the algorithm 800 can be executed as each task is identified by the data analyzer 1110, for example. In other cases, the decision algorithm 800 can be executed by a separate task-analyzing tool that is provided with relevant information from the data analyzer. The separate task-analyzing tool can be part of the code-checking system 100 or a stand-alone tool. A task-analyzing tool can be implemented as programming instructions, written to carry out an algorithm as depicted in FIG. 8, executing on hardware comprising logic gates and registers arranged as sequential logic circuits.

In embodiments, a task-designation algorithm 800 can begin by identifying (act 805) a task from a specified model (e.g., identifying a definition of a task from a specified model 102, or receiving a task identifier from a plurality of tasks that were identified by the data analyzer). The process can include determining (act 820) (e.g., using information and methods described above in connection with FIG. 4A through FIG. 5C) whether the task is activated by an alarm or event. If it is determined (act 820) that the task is activated by an event, then the task can be designated (act 824) as a first type of task (e.g., a task that enters a waiting state such as an extended task type, additionally or alternatively a task for which start and end times are not known a priori). When the Polyspace Code Checker™ software (modified with code as described in European Patent Application No. 17290155.5, filed Nov. 30, 2017 and titled "Systems and Methods for Evaluating Compliance of Implementation Code with a Software Architecture Specification") is used for code analysis, a first type designation for a task can be used to cause automatic configuration of an "-entry-points" option for the corresponding implemented code thread for multitasking analysis. The process 800 may then determine (act 840) whether there are remaining tasks (or portions of the specified model 102 to search for tasks). If there are any remaining tasks, the process can return to act 805. If there are no remaining tasks, the process may end.

If it is determined (act 820) that the task is not activated by an event, a step of determining (act 830) whether the task is activated by an alarm can be executed. If the task is not activated by an alarm, the process can designate (act 824) the task as a first type of task and proceed with act 840.

If it is determined (act 830) that the task is activated by an alarm, a step of determining (act 842) whether the alarm is periodic can be executed. If it is determined (act 842) that the alarm is not periodic, the process can designate (act 824) the task as a first type of task and proceed with act 840. If it is determined (act 842) that the alarm is periodic, the process can designate (act 844) the task as a second type of task (e.g., a task that cannot enter a waiting state such as a basic task, additionally or alternatively a task for which a start and end time can be determined a priori). With regard to the modified Polyspace Code Checker™ software mentioned above, a second type designation may be used to cause automatic configuration of a "-cyclic-tasks" option for the task in multitasking code analysis.

Further information that is needed for correct configuration of the code-checking system for multitasking analysis includes the corresponding identities of computational threads in the implementation code. As described above in connection with FIG. 3, a technical problem arises when multiple different identifiers are used for a same task, ISR, or resource defined in the specified model 102 during the code preparation process, so that a corresponding name 340 for the implemented thread in the implementation code 104 differs from the name 310 used to initially define the task in the specified model 102. FIG. 9A through FIG. 9E relate to an example of use of different identifiers for a task and an example solution for correctly identifying implemented computational threads in the implementation code 104.

FIG. 9A depicts a first portion 901 of a specified model 102 in which a task is defined and given a short name "Task_90_C" with a task-naming entry 920*a*. As an example, the task may be a task that is intended to initiate a cooling system (e.g., turn on a radiator fan) in an automotive system in response to an event from a sensor posting a temperature value of 100° C. or higher to an interface's data port. Following the methodology described above in connection with FIG. 4A-FIG. 4C, a second identifier 922 ("/ActiveEcuC/Os/eTask1" in this example) can be determined from a second portion 902 of the specified model, depicted in FIG. 9B, that contains an appropriate task-referencing entry 920*b*.

During preparation of implementation code 104 from the specified model 102, a code implementer (whether human or an automated implementation assistance tool) may be constrained by the system-build guidelines to use a portion of the second identifier 922 when defining the task for implementation code. As an example, the implementer may be required to use the last portion of the second identifier "eTask1" when preparing intermediate code 302 from the specified model. According to this example, the implementer may produce an intermediate-code portion 903 as depicted in FIG. 9C. A task-defining entry 960*a* in the intermediate code portion 903 can begin with a keyword ("TASK" in this example) and include a required portion of the second identifier 922, "eTask1" in this example.

The problem of using different task names during code preparation, described above, can occur when the intermediate-code portion 903 is processed by a code processor 330 to form implementation code 104. Although the code processor 330 may be constrained in part by requirements of the system-build guidelines, all details of code preparation may not be constrained or standardized. For example, the way in which implemented thread identifiers are defined in the implementation code 104 that correspond to tasks in the intermediate code 302 may not be standardized across all code processors 330. One code processor may use a different thread-naming macro than another code processor. Accordingly, a corresponding implementation code part 904, shown in FIG. 9D, can have a different and unknown corresponding identifier in a declaration 960*b* of the corresponding implemented thread (e.g., a different function name used in a function declaration). Any identifier can be used in a macro implemented by a code processor 330 that is used to name the corresponding implementation code part 904.

To overcome this problem, a tracing code processor 1120 (depicted in FIG. 11) can be used to determine the identity and location of an implemented computational thread in the implementation code 104 that corresponds to its associated task. A tracing code processor 1120 can be implemented as programming instructions executing on hardware comprising logic gates and registers arranged as sequential logic circuits. In embodiments, a tracing code processor 1120 can receive intermediate code 302 and corresponding implementation code 104. The tracing code processor 1120 can be programmed with, or receive, information from system-build guidelines relevant to code preparation, so that the tracing code processor 1120 produces comparative implementation code 104*a* that is similar to implementation code 104 produced by a code processor 330. However, a controlled macro can be used by the tracing code processor 1120 to name corresponding implementation code parts in the comparative implementation code 104*a* that correspond to code parts in the implementation code 104 produced by a code processor 330 using an unknown macro. For example, the controlled macro can produce an altered task identifier in the comparative implementation code 104*a* that can be identified and used to determine the actual identifier for the corresponding code part in the implementation code 104.

An example comparative implementation code part 905 associated with a task is depicted in FIG. 9E. In embodiments, a macro used by the tracing code processor 1120 can be controlled by a user, and/or is predetermined and known to the tracing code processor 1120. In the illustrated example, the tracing code processor 1120 can use a naming macro that appends "_IDn" to a task name that appears in the intermediate code 302 to produce an altered task identifier, though any naming macro can be used. In the illustrated embodiment, the numeric designation "n" in the macro extension may be used to identify instances in which a same name appears for different tasks in the intermediate code 302. For example, if the intermediate code 302 contained another instance of "eTask1" for another task, the macro extension would increment to "_ID2".

With internal knowledge of the naming macro used by the tracing code processor 1120, the tracing code processor can analyze and compare the comparative code 104*a* with the received implementation code 104 to determine the identifier of a task's corresponding implemented computational thread in the received implementation code 104. For example, the tracing code processor 1120 or other analysis tool can quickly search the comparative code 104*a* for any instances of at least a portion of the known macro-expanded function name (e.g., "eTask1" or "eTask1_ID" in this example), and determine whether there is one or more instances of the searched portion. For each instance, the analysis tool can identify indicative code line numbers, nearby coding entries, and/or lines of unprocessed code (such as "EventMaskType ev;" and "* Schedule: Full" in the illustrated example). The analysis tool can then search the implementation code 104 for similar and/or same code line numbers, coding entries, and/or lines of unprocessed code and indicative coding entries to unambiguously identify the task's corresponding implemented thread identifier and associated thread in the implementation code 104. A same procedure using a known naming macro can be used to identify computational threads in the implementation code 104 associated with ISRs that are defined in the specified model 102.

In some implementations, only comparative code 104a may be checked for the presence or absence of defects. In such cases, the implementation code 104 may not be provided to the tracing code processor 1120, and comparison of the implementation code 104 with the comparative code 104a may not be done. In such cases, knowledge of the naming macro used by the tracing code processor 1120 can be used to directly identify computational threads in the comparative code 104a associated with tasks and interrupts.

Once a task's or ISR's corresponding implemented thread identifier and associated thread in the implementation code 104 are identified, the implemented computational thread can be associated with attributes determined for the task or ISR by the data analyzer 1110 from the specified model and provided for use in automatic configuration of the code-checking system 100 for multitasking analysis. In some cases, task attributes, one or more task identifiers (e.g., short name, fully-qualified name), and a corresponding implemented thread identifier (e.g., function name) and associated thread code for each identified task can be recorded as configuration data 1160 for access by the code-checking system 100. Similarly, ISR attributes, one or more ISR identifiers (e.g., short name, fully-qualified name), and a corresponding implemented thread identifier (e.g., function name) and associated thread code for each identified ISR can be recorded as configuration data 1160 for access by the code-checking system 100.

Identification of a code section in the implementation code 104 associated with a resource defined in the specified model 102 can differ from the process used to identify computational threads for tasks and ISRs. Once an identifier for a resource has been determined for intermediate code 302 (e.g., "Resource BasicAirbag" which can be a variant of the short name shown in FIG. 7), a code processor 330 can use a macro (which is not known to the code-checking system 100) that changes the name of the resource when producing a corresponding section 1002 of implementation code 104, as depicted in FIG. 10A. In embodiments, a different but known macro can be used by a tracing code processor 1020 to produce a corresponding section 1003 of comparative implementation code 104a, as depicted in FIG. 10B.

In embodiments, a resource call can be associated with an implemented resource in the implementation code. For example, a first resource call 1020b can indicate that a processor (e.g., a processor of an ECU in a dynamic system) is to take an identified resource (indicated by a "TakeResource" call in this example). A second resource call 1020c can indicate that the processor can release the identified resource (indicated by a "ReleaseResource" call in this example). By analyzing the comparative code 104a and implementation code 104, a tracing code processor 1120 or analysis tool can determine the location and any associated identifier for an implemented resource in the implementation code 104 that corresponds to a resource defined in the specified model 102. With regard to the modified Polyspace Code Checker™ software mentioned above, identification of an implemented resource's corresponding initiation and release in the implementation code can be used to cause automatic configuration of "-critical-section-begin" and "-critical-section-end" options for the implemented resource in multitasking code analysis.

Figure 11:
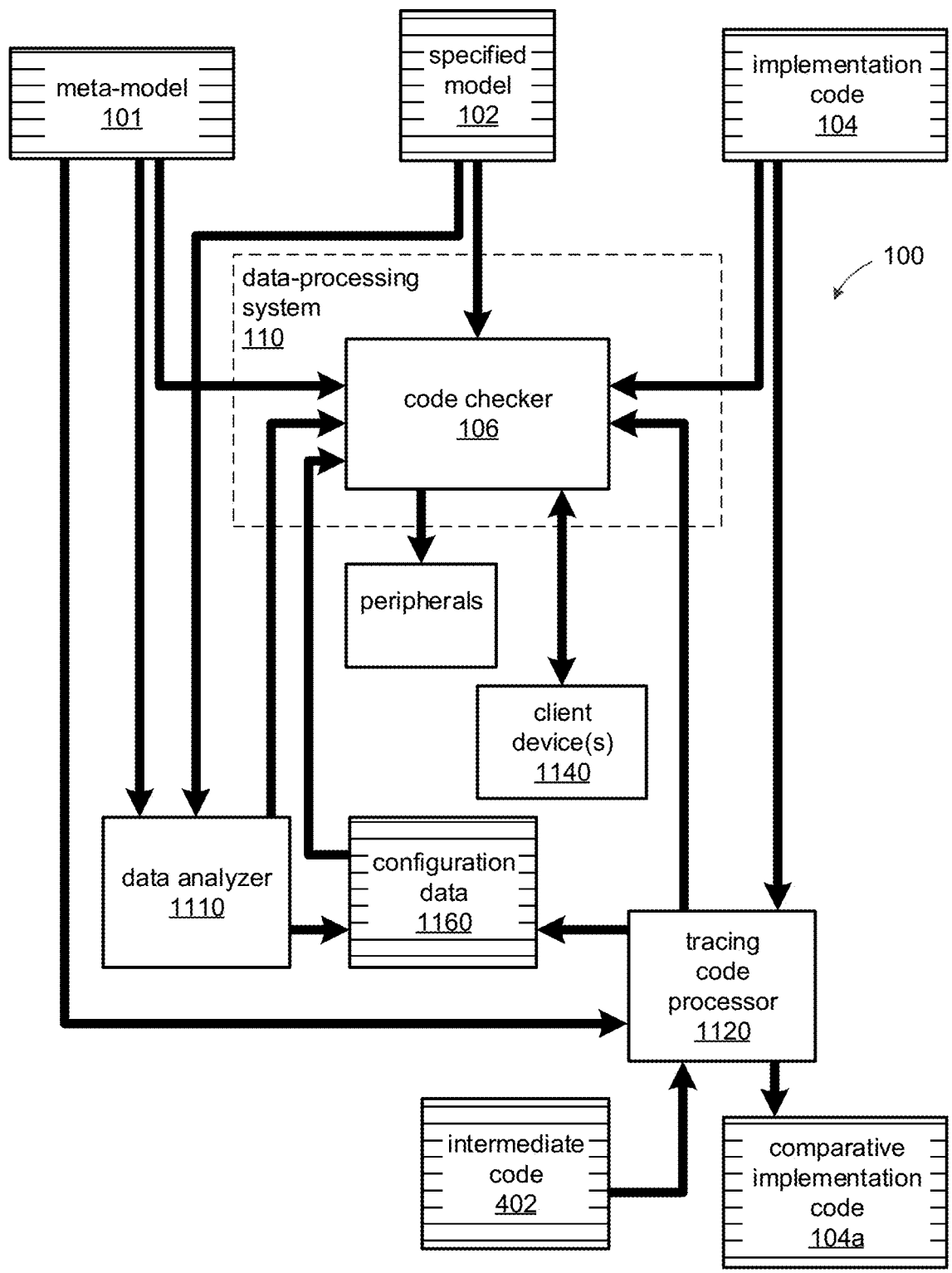
FIG. 11 depicts some components that can be included in embodiments of a code-checking system 100 adapted for automated multitasking analysis.

FIG. 11 depicts one possible embodiment arrangement of a code-checking system 100, a data analyzer 1110, and a tracing code processor 1120. In some cases, each of a code checker 106, data analyzer 1110, and tracing code processor 1120 can comprise one or more processors. In some implementations, the data analyzer 1110 can be part of the code-checking system 100. In such an implementation, functionality of the data analyzer 1110 and the code checker 106 can execute on one or more processors of a same data-processing system 110 of the code-checking system 100. In some cases, the tracing code processor 1120 can be part of the code-checking system 100. Similarly, functionality of the tracing code processor 1120 and the code checker 106 can execute one or more processors of a same data-processing system 110 of the code-checking system. In some implementations, the data analyzer 1110 and tracing code processor 1120 can be embodied in a same data-processing system that is separate from the code-checking system. Configuration data 1160 can be stored in one or more data structures and/or communicated to the data processing system 110 with the code checker 106 over one or more communication links. In yet other cases, the data analyzer 1110 and tracing code processor 1120 can both be part of the code-checking system 100, and their respective functionalities can execute on one or more processors of a same data-processing system 110 of the code-checking system 100.

Figure 12:
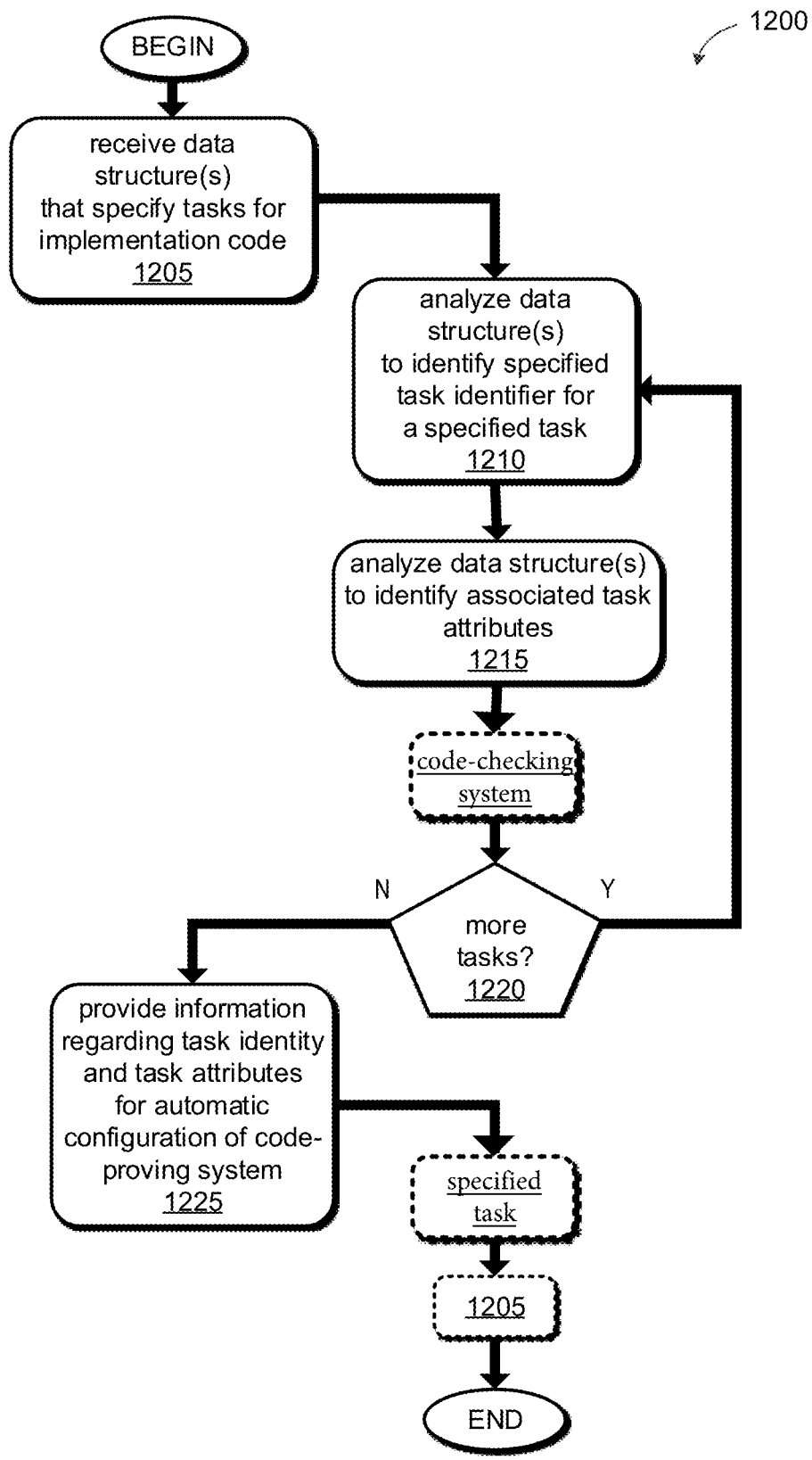
FIG. 12 illustrates example acts associated with a method of automatically identifying tasks, ISRs, and resources and their related attributes from a specified model, according to some embodiments.

FIG. 12 depicts example acts of a method that can be performed by a data analyzer 1110. A method 1200 of determining task identifiers and associated task attributes from a specified model 102 may begin with receiving (act 1205) one or more data structures of the specified model that define tasks that are to be implemented as computational threads in the implementation code 104. The method 1200 can include analyzing (act 1210) the one or more data structures to identify a task identifier for a specified task. The task identifier can include at least a portion of alphanumeric text that is used during preparation of implementation code 104 from the specified model 102. For example, the portion of alphanumeric text may be used in a definition of a task in the specified model 102 and further used as at least a portion of a reference to a corresponding code thread in the implementation code 104. The specified task can be one task of a plurality of tasks that are to be implemented as computational threads that can run concurrently in a dynamic system. The method 1200 can include analyzing (act 1215) the one or more data structures of the specified model 102 to identify attributes associated with the specified task. Attributes of a task can include information identifying how a task is activated, such as whether a task is activated by an event or by an alarm. The methods of analyzing (act 1210 and act 1215) can be methods as described above in connection with FIG. 4A through FIG. 5C. In some cases, the method 1200 can include a process of identifying a type of the specified task (e.g., method 800).

A method 1200 of determining task identifiers and associated task attributes from a specified model 102 can include determining (act 1220) whether the specified model 102 contains additional tasks. If the specified model contains additional tasks, then the process flow can return to analyzing (act 1210) the one or more data structures of the specified model to identify another task identifier for another specified task. If there are no remaining tasks, the process flow can include providing (act 1225) information regarding task identity and their associated task attributes for automatic configuration of a code-checking system 100 (e.g., providing the information to a code-checking system or storing the information as configuration data 1160 for access by a code-checking system). According to some embodiments, the method 1200 may end after each task and associated task attributes are identified from the one or more received data structures of the specified model 102.

In embodiments where data analyzer 1110 and a tracing code processor 1120 are implemented within a same data-processing system 110 as the code checker 106, the method 1200 can further include acts of a method 1300 of associating task attributes of each specified task with corresponding computational threads, as described below in connection with FIG. 13. For example, the process flow of method 1200 can proceed to step 1305 of method 1300. After method 1300 is completed, the process flow can include acts of a method 1400 of automatically configuring a code-checking system for multitasking analysis, as described below in connection with FIG. 14. For example, the process flow of method 1200 can proceed to step 1405 of method 1400.

In embodiments where the data analyzer 1110 is implemented within a same data-processing system 110 as the code checker 106, the method 1200 of determining task identifiers and associated task attributes from a specified model 102 can proceed with acts of a method 1400 of automatically configuring a code-checking system for multitasking analysis, described below in connection with FIG. 14. For example, the process flow of method 1200 can proceed to step 1405 of method 1400.

Figure 13:
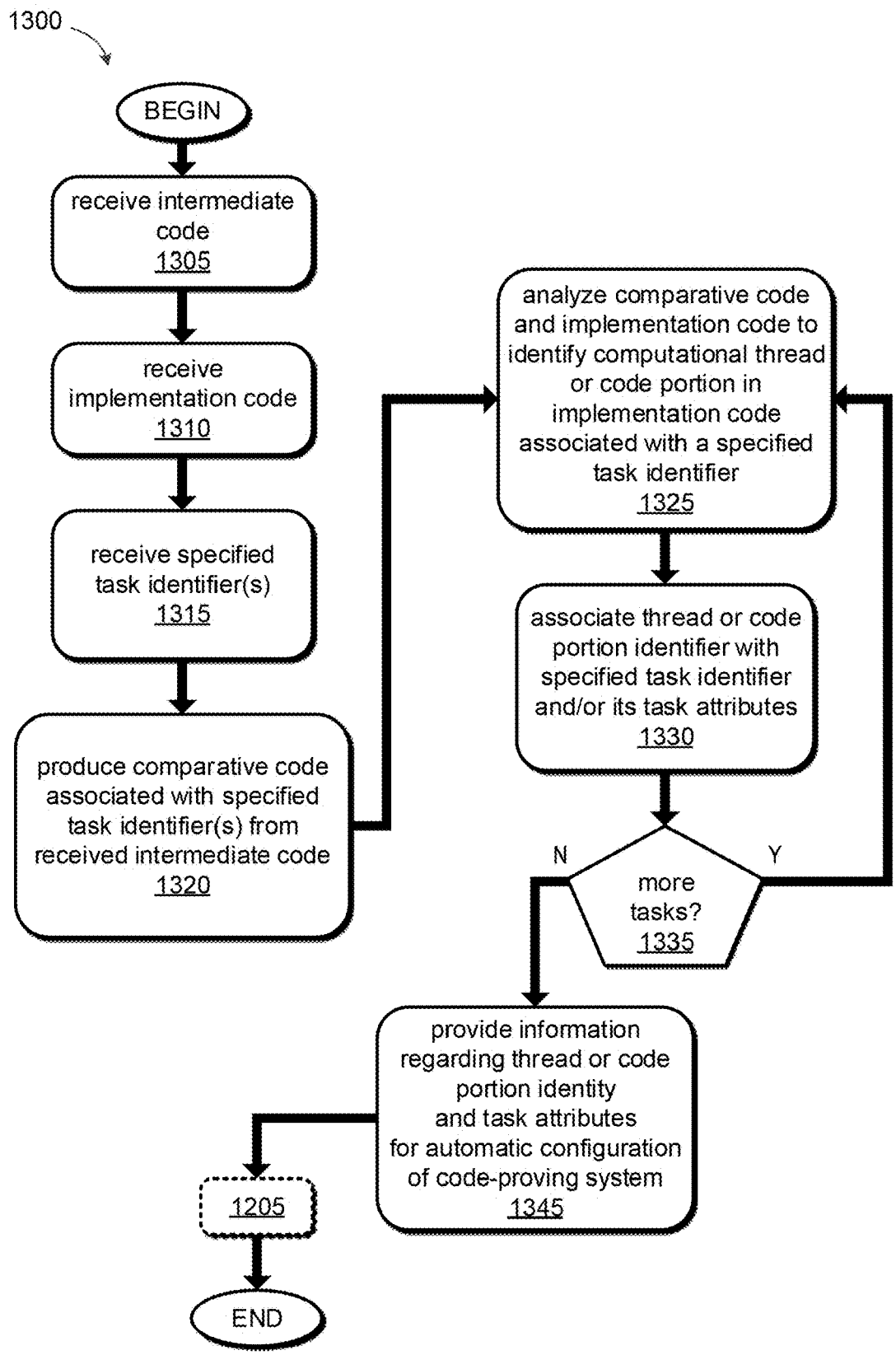
FIG. 13 illustrates example acts associated with a method of automatically associating attributes of specified tasks, ISRs, and resources to implemented code threads, according to some embodiments.

FIG. 13 depicts example acts of a method 1300 of associating task attributes of a specified model 102 to corresponding computational threads of an implementation code 104 or comparative code 104a prepared from the specified model. Method 1300 can be carried out with a tracing code processor 1120 and executing acts as described above in connection with FIG. 9E, according to some embodiments. A method 1300 can begin with receiving (act 1305) one or more data structures of intermediate code 302 prepared from a specified model 102. The method 1300 can also include receiving (act 1310) implementation code 104 that has been produced from the intermediate code. The method 1300 can also include receiving (act 1315) information about specified tasks that are present in the intermediate code. The received information can include the identifier for each specified task and can additionally include task attributes associated with each specified task. In some embodiments, the act 1315 of receiving information about specified tasks can be replaced with an act of determining specified task identifiers from the received intermediate code (e.g., by searching for a keyword such as "TASK" for the example shown in FIG. 9C).

A method 1300 of associating task attributes to corresponding computational threads can further include producing (act 1320) comparative code 104a from the received intermediate code 302. The produced comparative code can include a known variant of each specified task identifier, as described above in connection with FIG. 9E. A method 1300 can further include analyzing (act 1325) the comparative code 104a and implementation code 104 to identify a computational thread identifier in the implementation code that corresponds to a specified task identifier in the intermediate code 302, as described above in connection with FIG. 9E. The method 1300 can further include associating (act 1330) the implemented thread identifier and/or its corresponding computational thread with the specified task identifier and/or its associated task attributes. The act 1330 of associating a computational thread and its corresponding task attributes can be used to correctly designate the type of task to which the thread corresponds for the code-checking system 100. The act 1330 of associating can comprise recording a data link between a task identifier and/or its associated attributes and it's corresponding implemented code thread and/or thread identifier (e.g., recording a cross-referencing of data indicative of a task and data indicative of the task's corresponding computational thread). In some implementations, the act 1330 of associating can comprise transmitting data to a code checker 106 that identifies a type of task corresponding to implemented code thread based on information ascertained from the task's attributes.

Method 1300 can continue with determining (act 1335) whether there are any more tasks remaining in the received intermediate code 302. If there are more tasks remaining in the intermediate code, then the method 1300 can return to the step of analyzing (act 1325) the comparative code 104a and the received implementation code 104. If there are no more tasks remaining in the intermediate code 302, then the method 1300 can continue with providing (1345) information regarding thread identity and task attributes for automatic configuration of a code-checking system 100.

In some cases, information regarding thread identity and corresponding task attributes can be provided directly to a code-checking system 100 or recorded as configuration data 1160 for access by the code-checking system 100. If the tracing code processor 1120 is implemented within a same data-processing system 110 as the code checker 106, the method 1300 can continue with acts of a method 1400 for automatically configuring a code-checking system for multitasking analysis, as described below in connection with FIG. 14. Otherwise the method 1300 may end.

Figure 14:
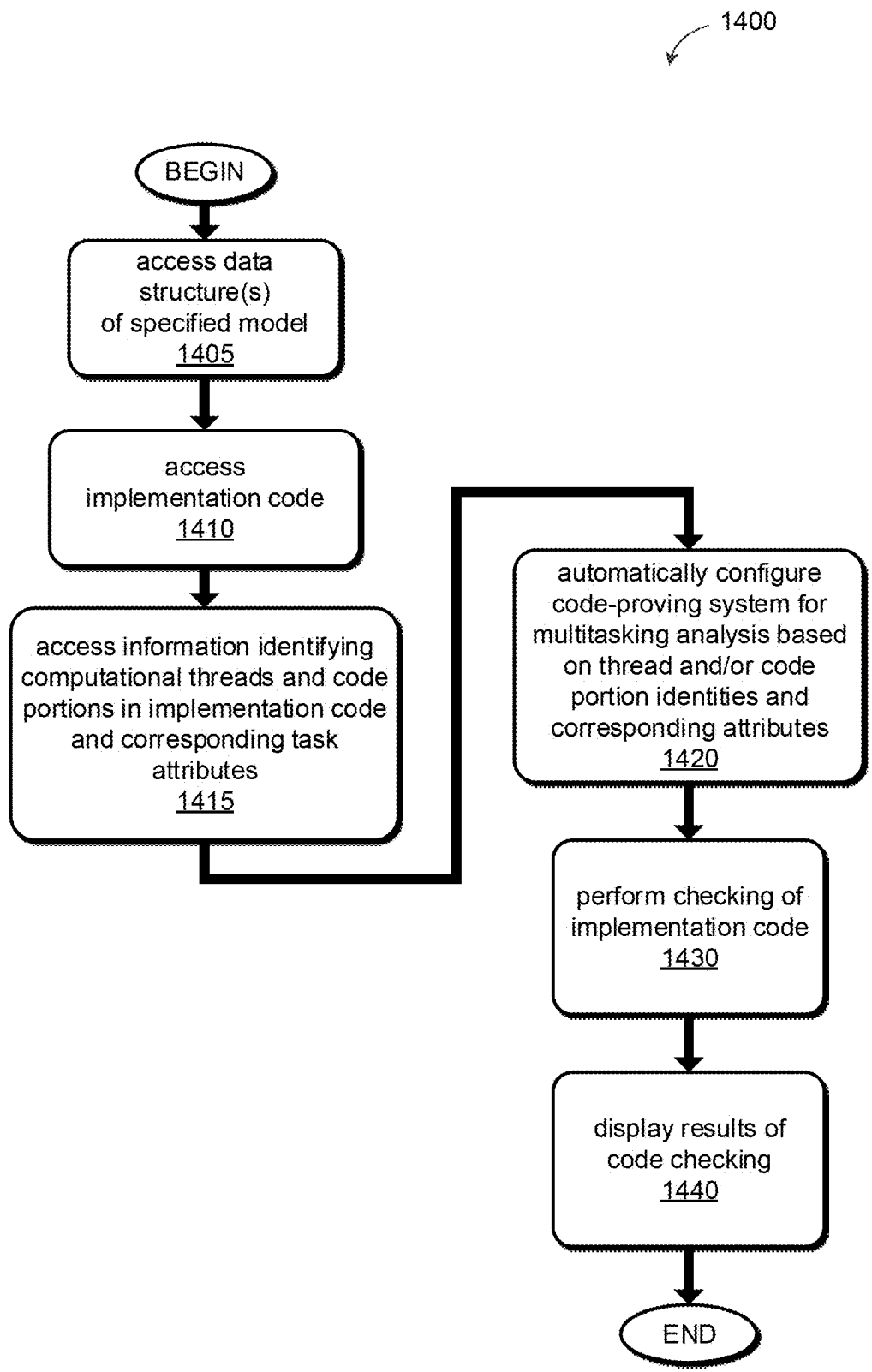
FIG. 14 illustrates example acts associated with a method of automatically configuring a code-checking system for multitasking analysis, according to some embodiments.

FIG. 14 depicts example acts of a method of automatically configuring a code-checking system for multitasking analysis. A method 1400 can begin with accessing (act 1405) one or more data structures of a specified model 102, and accessing (act 1410) implementation code 104 or comparative code 104a that was prepared from the specified model 102. A method 1400 can further include accessing (act 1415) information identifying computational threads and/or their identifiers in the implementation code and their corresponding attributes. In some implementations, the corresponding attributes can be associated with or otherwise identified with their corresponding computational threads and/or thread identifiers.

A method 1400 can further include automatically (act 1420) configuring a code-checking system 100 for multitasking analysis based on the implemented thread identities and their corresponding attributes. For example, each computational thread can be identified to the code checker 106 as being an incidence of a first type of task (e.g., an extended task) or a second type of task (e.g., a basic task). In some implementations, information about an event or alarm that activates the task can also be provided to the code checker 106, such as a location in the implementation code 104 of code corresponding to the event or alarm. A method 1400 for automatically configuring a code-checking system 100 for multitasking analysis can then continue with performing (act 1430) static code analysis of at least a portion of the implementation code, and displaying (act 1440) results of the static code analysis. Following analysis of the implementation code, the method 1400 may end.

Although acts of methods for analyzing a specified model 102, intermediate code 302, and implementation code 104 have been described above primarily with regard to tasks and their associated attributes in connection with FIG. 12 through FIG. 14, similar methods can be used for identifying interrupt service routines (ISRs) and resources and their associated attributes from a specified model 102. For example the method 1200 of determining task identifiers and associated task attributes from a specified model 102 shown in FIG. 12 can be executed for ISRs or resources where, in the drawing, the word "task" is replaced with "ISR" or "resource". Similarly the method 1300 for associating task attributes to corresponding computational threads can be carried out for ISRs and resources as shown in FIG. 13, where the word "task" is replaced with "ISR" or "resource."

In some embodiments, there can be only one type of ISR in a specified model 102. In such cases, corresponding computational threads can be identified in the implementation code 104 and automatically designated as one type of ISR for the code-checking system 100. Where there is more than one type of ISR, attributes of the ISR (e.g., a category of the ISR as indicated in FIG. 6) can be analyzed to determine a type of ISR to designate to the code-checking system 100.

Figure 15:
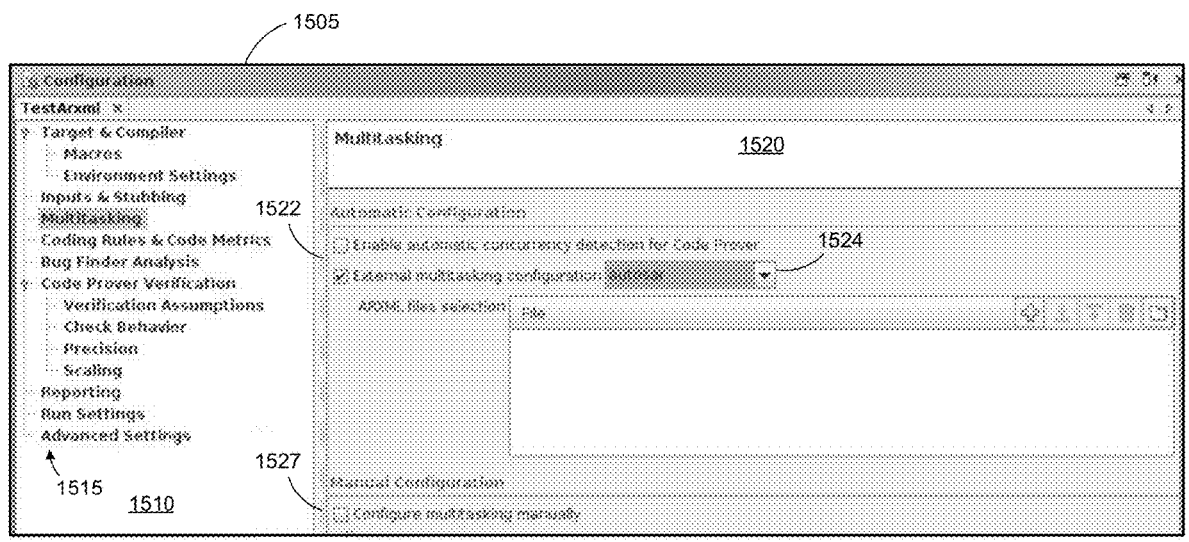
FIG. 15 depicts an example configuration user interface for a code-checking system that can be implemented to allow a user to identify files of a specified model relevant to analysis of implementation code, identify an applicable meta-model, and to select manual or automatic configuration of tasks and ISRs for multitasking analysis.

User interfaces for a code-checking system 100 can be rendered on a display 191 in any suitable form. Some example user interfaces are illustrated in FIG. 15 through FIG. 19. An example configuration user interface 1505 is shown in FIG. 15. A configuration user interface 1505 can allow a user to control various settings of the code-checking system 100 associated with multitasking code analysis. In an example embodiment, a configuration user interface 1505 can include a settings navigation panel 1510 and a multitasking configuration panel 1520. The settings navigation panel 1510 can allow a user to select various listed options 1515 in the panel that link to configuration settings of various features of the code-checking system 100. In this example, a "Multitasking" option in the listed options 1515 has been selected for configuration.

Selection of a multitasking option in the settings navigation panel 1510 can cause display of a multitasking configuration panel 1520. In embodiments, the multitasking configuration panel 1520 can allow a user to select between automatic configuration options 1522 and manual configuration options 1527. A manual configuration option 1527 can be selected if a user wishes to manually enter designations for tasks or ISRs and their associated attributes.

In some cases, there can be several options for automatic configuration of tasks and ISRs as depicted in the illustrated example of FIG. 15. A first option can be selected to allow the code checker to automatically detect concurrency of tasks and ISRs when reviewing or analyzing the implementation code 104. A second option can be selected for automatic external configuration of tasks and ISRs using external information (e.g., information provided by a data analyzer 1110 and tracing code processor 1120 that was determined external to the normal operation of the code checker 106). The first and second option of automatic configuration can also include a software architecture entry option 1524 that allows a user to identify a type of software architecture specification that applies to the code to be analyzed (AUTOSAR selected in this illustrated example).

Figure 16:
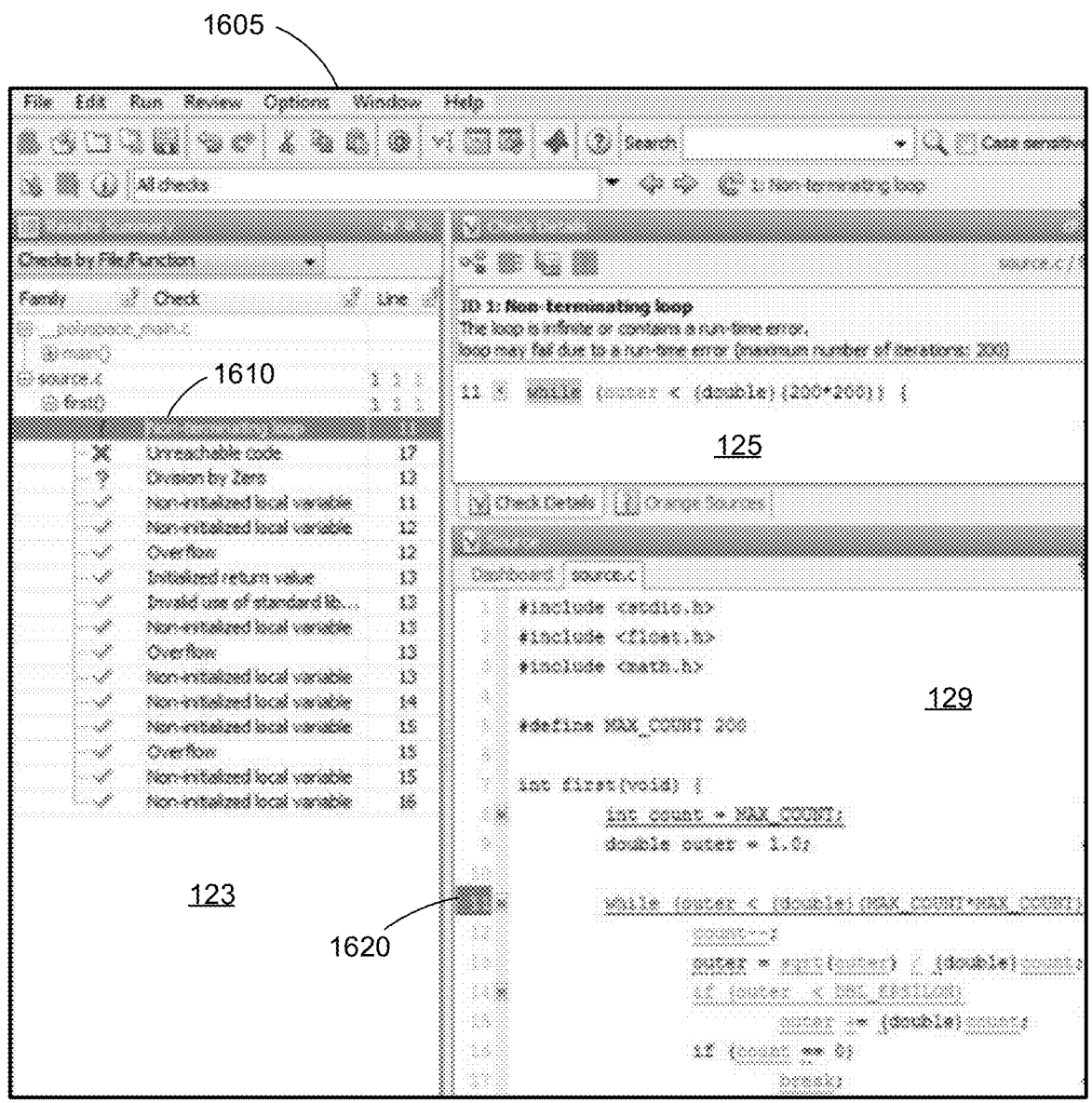
FIG. 16 depicts an example of a results user interface for a code-checking system that can be implemented to select and display code-analysis results.

An example results user interface 1605 that can display code-analysis results from a code-checking system 100 is depicted in FIG. 16. The results user interface 1605 can include a summary panel 123, a details panel 125, and a source code panel 129. The summary panel 123 can provide a listing of code checks that have been performed by the code-checking system 100 on a portion of the code, for example. In the illustrated example, the summary panel 123 summarizes code checks performed for one function (identified as "first( )") of the implementation code. The listing can indicate different types of code checks that were performed on each line of the source code, according to some embodiments. Each item in the list can be color coded and/or include a particular symbol that indicates whether or not the line of code passed a check (shown as a checkmark in this example), failed to pass a check (indicated by an "X" or a "?" in this example), or is known to result in a fatal runtime defect (indicated by an "!" in this example). Other types of summaries can be provided in the summary panel 123 in other embodiments, such as described in European Patent Application No. 17290155.5, filed Nov. 30, 2017 and titled "Systems and Methods for Evaluating Compliance of Implementation Code with a Software Architecture Specification".

For the illustrated example of FIG. 16, a user can select an entry in the summary panel 123. The selected result 1610 can be highlighted or otherwise emphasized upon user selection. The selected result 1610 can cause the code-checking system 100 to display associated information about the selected result 1610. For example, the code-checking system 100 can display further details of the particular coding defect in the details panel 125, as illustrated. The information can provide an explanation as to why the line of code was identified as having a defect. In the illustrated example, a number of iterations of a while loop exceeds a maximum number of iterations (200) permitted by either the specified model 102 or the system-build guidelines. The details panel can identify, in a sample line of code, maximum values for variables used in the corresponding implementation code, so that a user can quickly determine the reason for a potential runtime defect.

In embodiments, a code-checking system 100 can also display a line or section of the implementation code in the source code panel 129 that includes the line of code identified as having a coding defect and corresponding to the selected result 1610. In some cases, the code-checking system can highlight, color code, or otherwise emphasize the code section 1620 with the defect, so that the line of code can be quickly ascertained. By providing a link between a selected result 1610 in the summary panel 123, information relevant to the selected result in the details panel 125, and a corresponding section of the implementation code 104 in the source code panel 129, a user of the code-checking system 100 can quickly understand, navigate to, and correct defects found in the implementation code 104.

Figure 17:
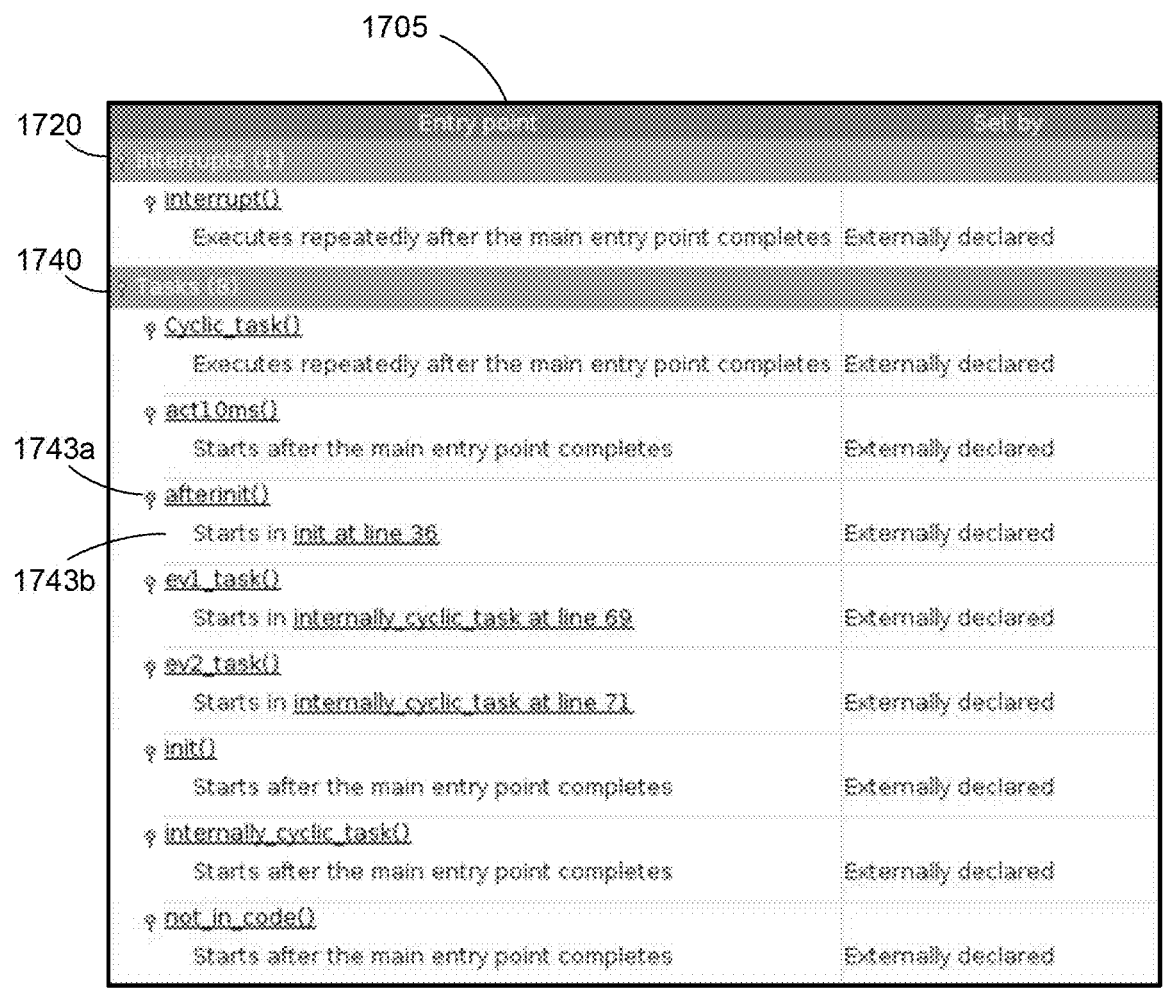
FIG. 17 depicts an example of a task/ISR user interface that can list and provide information relevant to tasks and ISRs identified in a specified model.

FIG. 17 depicts another example user interface that can be displayed by a code-checking system 100 to provide information relevant to multitasking code analysis for tasks and ISRs. In embodiments, a task/ISR summary interface 1705 can be displayed in any suitable manner on a display 191 of the code-checking system 100. The task/ISR summary interface 1705 can include a first listing 1720 of ISRs identified in a specified model 102 and a second listing 1740 of tasks identified in the specified model. The listings can contain one or more of the names associated with each ISR and each task and/or a corresponding computational thread identifier (e.g., a corresponding function declaration name used in the implementation code 104).

Each entry in the task/ISR summary interface 1705 can include one or more active items that provide links to the implementation code 104. For example, an implemented thread identifier 1743a can be rendered as active text and can be selected by a user to provide a link to and display of a section of the implementation code 104 that includes the implemented thread identifier 1743a and the associated source code of the implemented thread. Selecting the active text can cause display of the implemented thread's source code in a source code panel 129, for example.

Each entry in the task/ISR summary interface 1705 can also include activation information about the ISR or task. The activation information 1743b can also be rendered, at least in part, as an active item that provides a link to and display of a section of the implementation code 104 that is relevant to activation of the ISR or task. In this manner, a user of the code-checking system 100 can quickly and visually evaluate sections of a large code base that are particular to ISRs or tasks and their activating code.

Figure 18:
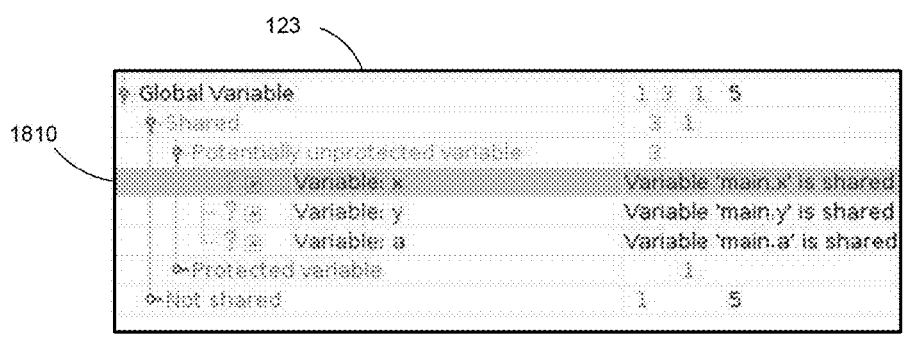
FIG. 18 depicts an example of multitasking analysis results that can be displayed by a code-checking system, according to some embodiments.

A code-checking system 100 can also display various types of summary user interfaces relevant to multitasking analysis to aid a user in understanding results from static code analysis of the implementation code 104. An example of displayed results relevant to multitasking is shown in FIG. 18. In embodiments, the code-checking system 100 can detect and display a listing of variables ("x", "y", "a") that are used by multiple tasks that run concurrently when executed. The code checker 106 can keep a record of variables used by concurrent tasks and determine whether a same variable is shared by multiple tasks and whether or not a shared variable is protected or unprotected. Shared variables that are not protected are subject to being overwritten or corrupted by a concurrent executing thread when a first thread using the variable is in a waiting state, and thereby leading to an incorrect result of the first thread when it resumes execution, for example.

Figure 19:
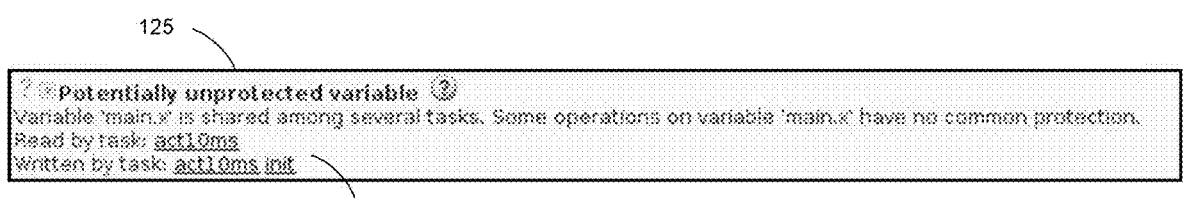
FIG. 19 depicts an example of multitasking result details relevant to the results depicted in FIG. 18 that can also be displayed by the code-checking system, according to some embodiments.

According to the illustrated example of FIG. 18, a user can select a shared variable entry 1810 to obtain further information about the shared variable in a details panel 125, a portion of which is shown in FIG. 19, as well as at least one corresponding section of implementation code 104 or comparative code 104a in a source code panel 129 (an example shown in FIG. 16) that includes a computational thread for a task that uses the shared variable. The details panel my provide information about the sharing of the variable and a task listing 1910 relevant to a shared variable. In this illustrated example, the variable "x" is shared by two tasks in different ways. A first task "act10ms" may read the variable and write a value to the variable. A second task "init" may also write a value to the variable. Since the variable is not protected a value written by one thread of the two tasks can be overwritten by a second thread of the other task. Entries in the details panel 125 shown in FIG. 19 can also include active items providing a link to corresponding source code for each task in the task listing 1910. In some cases, the code-checking system can use information about task, ISR, or resource identifiers in a specified model 102, a corresponding identifier in intermediate code 302, and a corresponding identifier for a computational thread or code part in implementation code 104 or comparative code 104a to maintain a link between model portions and their corresponding code parts. In this manner, information relevant to a task, ISR, or resource can be readily retrieved from a model file and/or code file, for example, for display to and inspection by a user to check and/or edit the model or code.

Results from additional code analysis of the specified model 102 and implementation code 104 can include consistency data between specified tasks in the specified model 102 and their corresponding implemented code threads. For example, one consistency check can comprise determining that there is a corresponding implemented code thread in the implementation code 104 for each task defined in the specified model 102. Detecting a discrepancy in number between specified tasks and corresponding implemented code threads can indicate missing tasks of missing code threads. Another consistency check can comprise determining that an implemented code thread exhibits behavior of its corresponding defining task. For example, an implemented code thread that includes an instruction causing the thread to enter a waiting state and that was defined in the specified model 102 as being a basic task type can indicate a defect in multitasking coding.

User interfaces such as those shown in FIG. 16 through FIG. 19 can be viewed and used by a user of the code-checking system 100 to easily review and understand results produced by the code-checking system. Displays provided by the code-checking system 100 are not limited to those shown in FIG. 16 through FIG. 19 and results from multitasking code analysis can be rendered in a variety of different ways.

Embodiments of the described technology relate to identifying computational threads in implementation code that are associated with concurrency elements (e.g., tasks, ISRs, and resources) and their attributes that are specified in a specified model 102. The specified model may comply with a meta-model description 101 and be prepared, at least in part, in conformance with the meta-model description and other aspects of system-build guidelines. The identification of concurrency elements can be based on identifying key terms or entries in the specified model associated with a particular concurrency element (e.g., definition of a task, ISR, or resource and its attributes), as described in example embodiments above. Identifying computational threads in implementation code 104 or comparative code 104a can comprise, at least in part, automatic code preparation in compliance with system-build guidelines of the implementation code 104 and/or comparative code 104a. Embodiments also relate to using information relevant to concurrency elements and corresponding implemented computational thread identities to automatically configure a code-checking system 100 for automated, multitasking code analysis to detect, or prove the absence of, defects in the parts of the implementation code.

Although the description above in connection with FIG. 3 through FIG. 10B of automatically identifying concurrency elements for use in configuring a code checker 106 relates to specified models 102 and implementation code 104 developed for an AUTOSAR application, aspects of the present embodiments can be applied to various architectural specifications and language specifications, such as those mentioned herein. In embodiments, a specified model 102 developed for a multi-level system architecture, such as a three-level system architecture described in connection with FIG. 2, can be analyzed to determine the presence and identities of concurrency elements in the specified model 102. The analysis can include using information (e.g., schema rules, key terms, etc.) obtained from an architectural specification 108, meta-model 101, and/or style guidelines 107 that can identify data structures (such as containers or lines of code) within the specified model 102 that are used to define concurrency elements and from which attributes about concurrency elements can be obtained. The analysis can include using the system-build guidelines to track and identify a same concurrency element in different data structures where a different identifier may be used for the same concurrency element and to collect attribute information that is provided in different data structures for the concurrency element. The analysis can also include using system-build guidelines that guides formation of implementation code from the specified model 102 to identify computational threads in the implementation code that correspond to concurrency elements identified from the specified model 102. In this manner, code associated with a concurrency element can be automatically identified and resolved across different layers of a multi-layer software architecture 200 for a dynamic system or computing system, and attributes relevant to the concurrency element can be used to automatically configure a code-checker 106.

Figure 20:
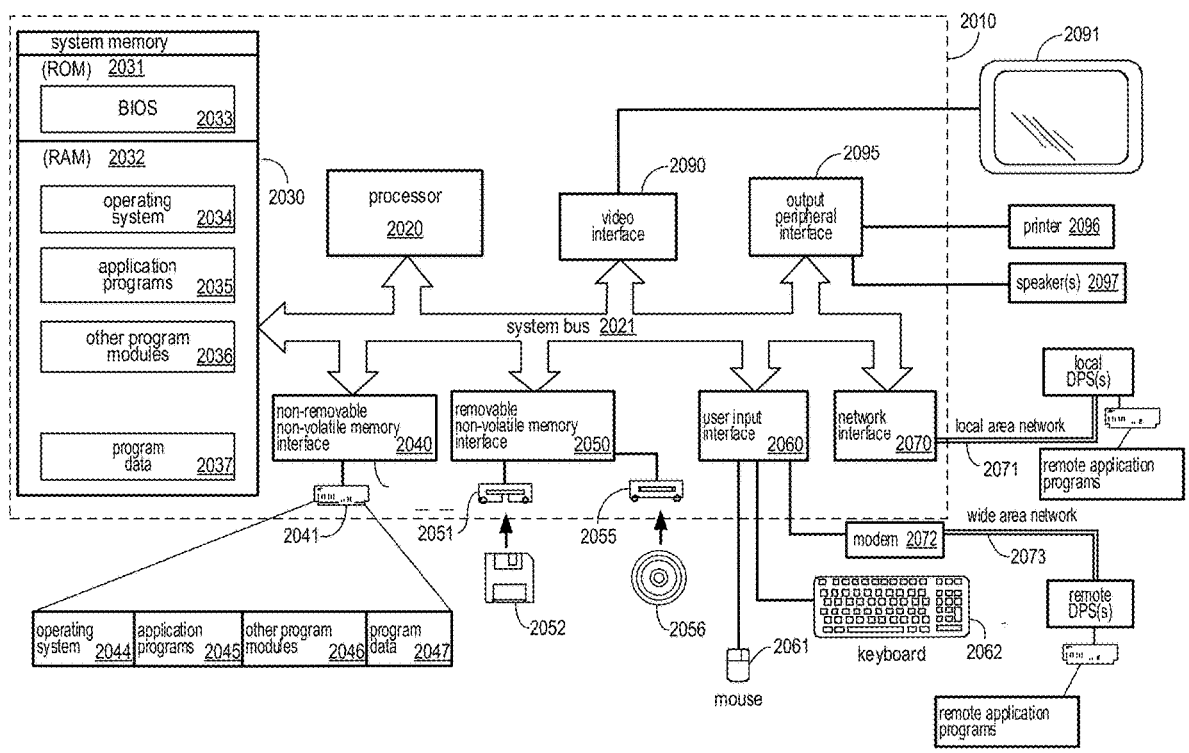
FIG. 20 depicts an example of a computing environment that can be specially adapted with computer programming instructions to analyze implementation code in accordance with the present embodiments.

FIG. 20 depicts, in further detail, components of a data-processing system 110 that can be adapted for operation as a code-checking system 100. Some or all of the components shown may be present in a code-checking system 100, for example. In a distributed computing environment, some components may be located on a server and some components may be located on a client device 1140, referring to FIG. 12. In some embodiments, a device for implementing automated configurations for multitasking code analysis of implemented code 104 can include a computing device 2010 which can be embodied as a desktop computer, a workstation, or a laptop computer. Suitable workstations include Dell Precision series of workstations from Dell, Inc. of Round Rock, Tex., the HP Z400, Z600 and Z800 series of workstations from Hewlett Packard Co. of Palo Alto, Calif., among others. Other computing devices that may be used include palm computers and other portable computing devices, e.g., smart phones.

Components of computing device 2010 can include, but are not limited to, a processing unit 2020, a memory 2030, and a bus 2021 that couples various components including the memory to the processing unit 2020. Example processing units 2020 include, but are not limited to, single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

The bus 2021 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2010 can include one or more types of machine-readable media. Machine-readable media can be any available media that can be accessed by computer 2010 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by computer 2010.

The memory 2030 can include computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, may be stored in ROM 2031. RAM 2032 may contain data and/or program modules that are immediately accessible to and/or presently being operated on by processing unit 2020. By way of example, and not limitation, FIG. 20 illustrates an operating system 2034, application programs 2035, other program modules 2036, and program data 2037.

The computer 2010 can also include other removable/non-removable, volatile/nonvolatile machine-readable media. By way of example only, FIG. 20 illustrates a hard disk drive 2041 that reads from or writes to non-removable, nonvolatile magnetic media, a magnetic disk drive 2051 that reads from or writes to a removable, nonvolatile magnetic disk 2052, and an optical disk drive 2055 that reads from or writes to a removable, nonvolatile optical disk 2056 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 2041 may be connected to the system bus 2021 through a non-removable memory interface such as interface 2040, and magnetic disk drive 2051 and optical disk drive 2055 may be connected to the system bus 2021 by a removable memory interface, such as interface 2050.

The drives and their associated machine-readable media discussed above and illustrated in FIG. 20, provide storage of machine-readable instructions, data structures, program modules and other data for the computer 2010. In FIG. 20, for example, hard disk drive 2041 is illustrated as storing operating system 2044, application programs 2045, other program modules 2046, and program data 2047. These components may either be the same as, or different from, operating system 2034, application programs 2035, other program modules 2036, and program data 2037. Operating system 2044, application programs 2045, other program modules 2046, and program data 2047 are given different numbers here to illustrate that, at a minimum, they are different copies.

A user can enter commands and information into the computer 2010 through input devices such as a keyboard 2062 and pointing device 2061, commonly referred to as a mouse, trackball or touch pad. Other input devices (not shown) can include a microphone, joystick, game pad, satellite dish, scanner, or the like. These and other input devices can be connected to the processing unit 2020 through a user input interface 2060 that is coupled to the system bus, but can be connected by other interface and bus structures, such as a parallel port, game port or a universal serial bus (USB). A monitor 2091 or other type of display device can also be connected to the system bus 2021 via an interface, such as a video interface 2090. In addition to the monitor, a computing device 2010 can also include other peripheral output devices such as speakers 2097 and printer 2096, which can be connected through a output peripheral interface 2095.

The computer 2010 can operate in a networked environment using logical connections to one or more remote devices, such as a remote computer 2080. The remote computer 2080 may be a personal computer, a server, a router, a network PC, a peer device or other common network node, and may include many or all of the elements described above relative to the computer 2010, although only a memory storage device 2081 has been illustrated in FIG. 20. The logical connections depicted in FIG. 20 include a local area network (LAN) 2071 and a wide area network (WAN) 2073, but may also include other networks. Such networking environments may be commonplace in offices, enterprise-wide computer networks, intranets and the Internet. Network connections can be wired, optical fiber based, or wireless.

When used in a LAN networking environment, the computer 2010 can be connected to the LAN 2071 through a network interface or adapter 2070. When used in a WAN networking environment, the computer 2010 may include a modem 2072 or other means for establishing communications over the WAN 2073, such as the Internet. The modem 2072, which may be internal or external, may be connected to the system bus 2021 via the user input interface 2060, or other appropriate mechanism. In a networked environment, program modules depicted relative to the computer 2010, or portions thereof, may be stored in a remote memory storage device. By way of example, and not limitation, FIG. 20 illustrates remote application programs 2085 as residing on memory device 2081L 2081R. It will be appreciated that the network connections shown are exemplary and other means of establishing a communications link between the computers may be used.

Figure 21:
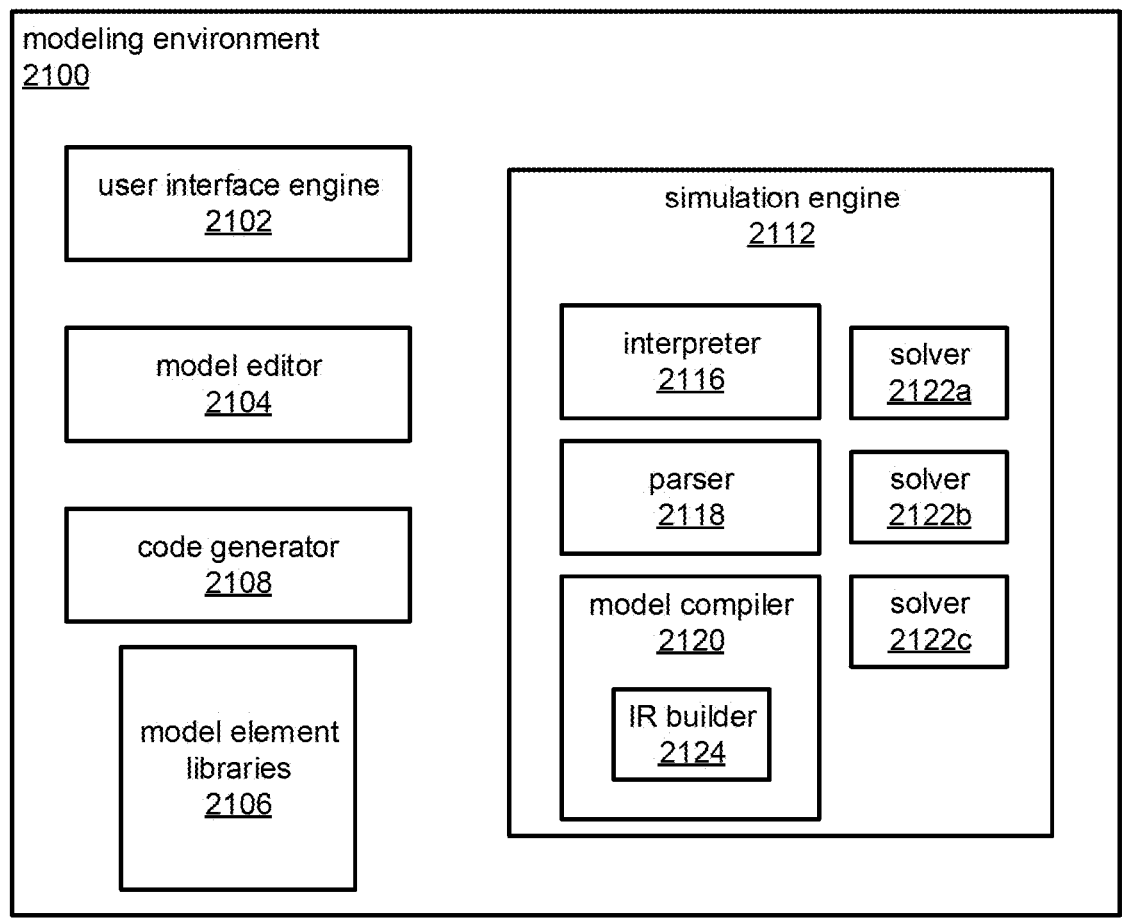
FIG. 21 is a partial, schematic illustration of an example of a modeling environment.

Some models related to the present embodiments can be developed and simulated in a modeling environment 2100, and example of which is depicted in FIG. 21. The modeling environment 2100 can include a User Interface (UI) engine 2102, a model editor 2104, one or more model element libraries 2106, a code generator 2108, and a simulation engine 2112. The UI engine 2102 can create and present one or more User Interfaces (UIs), such as Graphical User Interfaces (GUIs) and/or Command Line Interfaces (CLIs), on a display 191 of a data processing device, such as a workstation, laptop, tablet, etc. The GUIs and CLIs can provide a user interface to the modeling environment 2100, such as a model editing window. The model editor 2104 can perform selected operations on a model, such as open, create, edit, and save, in response to the user inputs or programmatically.

The simulation engine 2112 can include an interpreter 2116, a parser 2118, a model compiler 2120, and one or more solvers, such as solvers 2122*a-c*. The model compiler 2120 can include one or more Intermediate Representation (IR) builders, such as IR builder 2124. In some implementations, one or more IR builders can be included or associated with the solvers 2122. The simulation engine 2112 can execute, e.g., compile and run or interpret, computer-generated, executable models using one or more of the solvers 2122*a-c*. For example, the solvers 2122 can generate a set of equations for a model, and can solve the set of equations. The solvers 2122 can also generate a solution for an in-memory, intermediate representation (IR) of a model that represents a set of equations. The solvers 2122 can generate the solution for the IR using numerical techniques. Exemplary solvers include one or more fixed-step continuous time solvers, which can utilize numerical integration techniques, and one or more variable-step solvers, which may, for example, be based on the Runge-Kutta or Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the Simulink User's Guide from The MathWorks, Inc. (March 2017 ed.)

The code generator 2108 can access a model, such as a specified model 102, and can generate code for the model. In some embodiments, the generated code can be source code, which can be compiled by the model compiler 2120, and executed by one or more processors outside of the modeling environment 2100. The generated code can thus be standalone code relative to the modeling environment 2100. Examples of generated code include Ada, Basic, C, C++, C #, FORTRAN, assembly code, and Hardware Description Language (HDL) code, such as VHDL, Verilog, or SystemC, among others, which may be used to synthesize a programmable logic device.

Exemplary modeling environments include the MATLAB® technical computing environment (TCE) and the Simulink® model-based design environment both from The MathWorks, Inc. of Natick, Mass., as well as the Simscape™ physical modeling system, the SimEvent® discrete-event modeling tool, and the Stateflow® state chart tool also from The MathWorks, Inc., Embedded Coder® also available from The MathWorks, Inc. of Natick, Mass., DaVinci Developer, available from Vector Informatik GmbH of Stuttgart, Germany, the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level modeling environment can contain less implementation detail, and thus operate at a higher level than certain programming languages, such as the C, C++, C #, and SystemC programming languages.

With a modeling environment 2100, simulated execution of a model can be carried out, e.g., to approximate the operation of a dynamic system. Simulated execution of a model may also be referred to as simulating the model. Models constructed within the modeling environment 2100 may include textual models, graphical models, such as block diagrams, state-based models, discrete-event models, physical models, and combinations thereof. A graphical model can include icons or blocks that represent computations, functions or operations, and interconnecting lines or arrows among the blocks can represent data, signals, or relationships among those computations, functions, or operations. The icons or blocks, moreover, can be selected by the user from one or more of the libraries or palettes 2106 that contain icons or blocks for the blocks supported by the modeling environment 2100. A model editor GUI can include a Run button that can be selected by the user. The modeling environment 2100 can also be configured to receive a run command entered by the user, e.g., in the GUI or in a Command Line Interface (CLI). In response to the user selecting the Run button or entering the run command, the simulation engine 2112 can execute the model, and can present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 2100 may implement a declarative language. A declarative language is a language that expresses the logic of a computation without describing its control flow. A declarative language can describe what a program must accomplish in terms of the problem domain, rather than describe how to accomplish it as a sequence of the programming language primitives. In some cases, a declarative language can implement single assignment in which variables are assigned once and only once. Examples of languages that support declarative modeling include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model can include computational implementations that are implicitly defined by a declarative language.

It should be understood that the modeling environment 2100 is intended for illustrative purposes and that the present disclosure can be used with other modeling environments. For example in some implementations, the code generator 2108 and/or the compiler 2120 can be separate from the modeling environment 2100.

One or more of the user interface engine 2102, the model editor 2104, the code generator 2108, the model compiler 2120, and the simulation engine 2112 can be implemented through one or more software modules and/or libraries containing program instructions that perform the methods described herein when executed on logic circuitry of one or more processors. The software modules can be stored in a memory, such as a main memory, a persistent memory and/or a computer readable media, of a workstation, server, or other data processing machine or device, and executed by one or more processors. Other computer readable media can also be used to store and execute these program instructions, such as non-transitory computer readable media, including optical, magnetic, or magneto-optical media. In some embodiments, one or more of the user interface engine 2102, the model editor 2104, the code generator 2108, the model compiler 2120, and the simulation engine 2112 can comprise hardware registers and combinational logic configured and arranged to produce sequential logic circuits. In some embodiments, various combinations of software and hardware, including firmware, can be utilized to implement the described methods.

Suitable code generators for use with the present disclosure include, but are not limited to, the MATLAB® Coder™, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers can be used in addition to or alternative to those described for the modeling environment 2100.

Example methods of the described technology include combinations of processes (1) through (27) as described below. Examples of computer-readable medium that can be implemented according to the described technology are indicated by configuration (28). An example system that can be implemented according to the described technology is indicated by configuration (30).

(1) A computer-implemented process for checking computer code, the process comprising receiving, by a data analyzer, one or more data structures containing information that specifies tasks to be implemented in the form of parts of implementation code that controls a dynamic system, wherein a portion of the tasks are to be executed concurrently on a processor of the dynamic system using different computational threads within the parts of the implementation code; automatically analyzing, by the data analyzer, the one or more data structures to identify specified task identifiers for each task of the portion of the tasks; automatically analyzing, by the data analyzer, the one or more data structures to identify task attributes relevant to concurrent execution of the portion of the tasks on the processor of the dynamic system; and providing information regarding task identity and the task attributes of the portion of the tasks for automatically performing code checking of the parts of the implementation code to detect, or prove the absence of, defects in the parts of the implementation code.

(2) The process of (1), wherein the task attributes are distributed across multiple, disjoint data structures or at disjoint locations within a data structure.

(3) The process of (1) or (2), wherein the task attributes comprise information about types of occurrences that initiate each task in the portion of tasks.

(4) The process of (3), wherein a first type of occurrence is an event associated with a change in state at a data port associated with a task of the portion of tasks and a second type of occurrence is an alarm associated with a task of the portion of tasks.

(5) The process of (3) or (4), further comprising determining a designation for at least one task of the portion of tasks based on a type of occurrence that initiates the task.

(6) The process of any one of (1) through (5), wherein the task attributes comprise information about software resources utilized by the portion of tasks.

(7) The process of any one of (1) through (6), further comprising automatically analyzing, by the data analyzer, the one or more data structures to identify interrupt service routines (ISRs) that can execute concurrently with the tasks on the processor of the dynamic system, and providing information regarding the ISRs for automatically performing static code analysis.

(8) The process of any one of (1) through (7), further comprising automatically analyzing, by the data analyzer, the one or more data structures to identify resources that can be used by the portion of tasks, and providing information regarding the resources for automatically performing static code analysis.

(9) The process of (7) or (8), further comprising receiving, by a code-checking system, the one or more data structures; receiving, by the code-checking system, a portion of the implementation code containing the parts of the implementation code; receiving, by the code-checking system, the information about task identity and the task attributes; receiving, by the code-checking system, the information about the ISRs; processing, by a code tracing processor, at least a portion of the one or more data structures to automatically produce comparative code using one or more altered task identifiers for the specified task identifiers; analyzing the comparative code and the received portion of the implementation code to identify the computational threads in the parts of the implementation code that corresponds to the specified task identifiers; associating the received task attributes with their corresponding computational threads; and statically analyzing, by the code-checking system, the parts of the implementation code based on the associated task attributes and received information regarding the ISRs to detect, or prove the absence of, defects in the parts of the implementation code.

(10) The process of (9), wherein the defects include runtime errors.

(11) The process of (9) or (10), further comprising automatically configuring the code-checking system based on the received task attributes to recognize at least one computational thread as being a basic task type or an extended task type.

(12) The process of any one of (9) through (11), further comprising receiving, by the code-checking system, at least one attribute for a task selected from the group consisting of: a task type, a priority value for the task, and a type of occurrence that activates the task.

(13) The process of any one of (9) through (12), further comprising automatically configuring the code-checking system based on the received information about the ISRs to recognize at least one computational thread as being an interrupt service routine.

(14) The process of any one of (9) through (13), further comprising receiving, by the code-checking system, at least one attribute for an ISR selected from the group consisting of: an ISR type, a priority value for the ISR, and a type of occurrence that activates the ISR.

(15) The process of any one of (9) through (14), further comprising automatically configuring the code-checking system based on received information about resources to recognize in at least one computation thread a beginning of a section of code having protected access.

(16) The process of any one of (9) through (15), further comprising receiving, by the code-checking system, at least one attribute for a resource selected from the group consisting of: an identifier that marks a beginning of a section of code having protected access and an identifier that marks an end of the section of code having protected access.

(17) The process of any one of (9) through (16), further comprising identifying unprotected variables shared by multiple tasks of the portion of tasks.

(18) The process of any one of (9) through (17), wherein the one or more data structures include one or more data structures of intermediate code.

(19) The process of any one of (9) through (18), further comprising providing, by the code-checking system, consistency information that identifies at least one measure of consistency between the specified task identifiers in the one or more data structures and the computational threads in the parts of the implementation code.

(20) The process of (19), wherein a first measure of consistency comprises consistency between a first number of the specified task identifiers and a second number of the computational threads or computational thread identifiers for the computational threads.

(21) The process of (19) or (20), wherein a second measure of consistency comprises consistency between types of tasks determined for the specified task identifiers from the one or more data structures and types of the computational threads.

(22) The process of any one of (9) through (21), further comprising determining from the task attributes whether each task of the portion of tasks is activated by an event or an alarm; and providing information relevant to activation of each task of the portion of tasks for automatically performing static code analysis of the parts of the implementation code.

(23) The process of (22), further comprising storing in memory the information about task identity and the task attributes, the information about the ISRs, implemented computational thread identifiers, and information about activation of each task as configuration data for a code-checking system.

(24) The process of any one of (1) through (23), wherein the one or more data structures are data structures of a specified model and the parts of the implementation code are prepared from the one or more data structures according to a standardized methodology.

(25) The process of any one of (1) through (24), wherein the one or more data structures are ARXML files of an AUTOSAR compliant specified model.

(26) The process of any one of (1) through (24), wherein the specified model is a specified model compliant with OSEK, UML, SysML, AADL, MARTE, or ARINC.

(27) The process of any one of (1) through (26), further comprising performing static analysis of the parts of the implementation code, wherein the static analysis comprises one or a combination of: abstract interpretation, model checking, and satisfiability solving.

(28) Computer readable medium containing instructions that, when executed by at least one processor, adapt a system that includes the at least one processor to perform acts of any one of processes (1) through (27).

(29) A computer-implemented process for checking computer code, the process comprising receiving, by a data analyzer, one or more data structures containing information that specifies interrupt service routines (ISRs) to be implemented in the form of parts of implementation code that controls a dynamic system, wherein a first ISR of the ISRs is associated with a first computational thread within the parts of the implementation code that will execute concurrently on a processor of the dynamic system with at least a second different computational thread automatically analyzing, by the data analyzer, the one or more data structures to identify an ISR identifier for the first ISR; and providing information regarding identity of the first ISR for automatically performing code checking of the parts of the implementation code to detect, or prove the absence of, defects in the parts of the implementation code.

(30) A code-analyzing system comprising at least one processor adapted with executable instructions to receive one or more data structures containing information that specifies tasks to be implemented in the form of parts of implementation code that controls a dynamic system, wherein a portion of the tasks are to be executed concurrently on a processor of the dynamic system using different computational threads within the parts of the implementation code; automatically analyze the one or more data structures to identify specified task identifiers for each task of the portion of the tasks; automatically analyze the one or more data structures to identify task attributes relevant to concurrent execution of the portion of the tasks on the processor of the dynamic system; and provide information regarding task identity and the task attributes of the portion of the tasks for automatically performing code checking of the parts of the implementation code to detect, or prove the absence of, defects in the parts of the implementation code.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A computer-implemented method for checking computer code, the method comprising:
    receiving one or more data structures containing information that specifies tasks to be implemented in the form of parts of implementation code, wherein a portion of the tasks are to be executed concurrently on a processor using different computational threads within the parts of the implementation code;
    automatically analyzing the one or more data structures to identify specified task identifiers for each task of the portion of the tasks or interrupt service routines (ISRs) that can execute concurrently with the tasks on the processor;
    automatically analyzing the one or more data structures to identify task attributes or information regarding the ISRs relevant to concurrent execution of the portion of the tasks or the ISRs on the processor;
    generating comparative code based on at least a portion of the one or more data structures and the specified task identifiers or the identified ISRs;
    identifying, based on the comparative code and a portion of the implementation code, computational threads in the parts of the implementation code that correspond to the specified task identifiers or the ISRs;
    associating the received task attributes or the information regarding the ISRs with their corresponding computational threads; and
    detecting, or proving the absence of, defects in the parts of the implementation code based on the associated task attributes or the associated information regarding the ISRs.

2. The method of claim 1, wherein the task attributes are distributed across multiple, disjoint data structures or at disjoint locations within a data structure.

3. The method of claim 1, wherein the task attributes comprise information about types of occurrences that initiate each task in the portion of tasks.

4. The method of claim 3, wherein a first type of occurrence is an event associated with a change in state at a data port associated with a task of the portion of tasks and a second type of occurrence is an alarm associated with a task of the portion of tasks.

5. The method of claim 3, further comprising determining a designation for at least one task of the portion of tasks based on a type of occurrence that initiates the task.

6. The method of claim 1, wherein the task attributes comprise information about software resources utilized by the portion of tasks.

7. The method of claim 1, further comprising:
    automatically analyzing the one or more data structures to identify resources that can be used by the portion of tasks; and
    providing information regarding the resources for automatically performing static code analysis.

8. The method of claim 1, further comprising:
    receiving, by a code-checking system, the one or more data structures;
    receiving, by the code-checking system, the portion of the implementation code, the portion of the implementation code containing the parts of the implementation code;
    receiving, by the code-checking system, information about task identity and task attributes;
    receiving, by the code-checking system, the information regarding the ISRs.

9. The method of claim 8, wherein the defects include runtime errors.

10. The method of claim 8, further comprising automatically configuring the code-checking system based on the received task attributes to recognize at least one computational thread as being a basic task type or an extended task type.

11. The method of claim 10, further comprising receiving, by the code-checking system, at least one attribute for a task selected from the group consisting of: a task type, a priority value for the task, and a type of occurrence that activates the task.

12. The method of claim 8, further comprising automatically configuring the code-checking system based on the received information about the ISRs to recognize at least one computational thread as being an interrupt service routine.

13. The method of claim 12, further comprising receiving, by the code-checking system, at least one attribute for an ISR selected from the group consisting of: an ISR type, a priority value for the ISR, and a type of occurrence that activates the ISR.

14. The method of claim 8, further comprising automatically configuring the code-checking system based on received information about resources to recognize in at least one computation thread a beginning of a section of code having protected access.

15. The method of claim 14, further comprising receiving, by the code-checking system, at least one attribute for a resource selected from the group consisting of: an identifier that marks a beginning of a section of code having protected access and an identifier that marks an end of the section of code having protected access.

16. The method of claim 8, further comprising identifying unprotected variables shared by multiple tasks of the portion of tasks.

17. The method of claim 8, wherein the one or more data structures include one or more data structures of intermediate code.

18. The method of claim 8, further comprising providing, by the code-checking system, consistency information that identifies at least one measure of consistency between the specified task identifiers in the one or more data structures and the computational threads in the parts of the implementation code.

19. The method of claim 18, wherein a first measure of consistency comprises consistency between a first number of the specified task identifiers and a second number of the computational threads or computational thread identifiers for the computational threads.

20. The method of claim 18, wherein a second measure of consistency comprises consistency between types of tasks determined for the specified task identifiers from the one or more data structures and types of the computational threads.

21. The method of claim 8, further comprising:
determining from the task attributes whether each task of the portion of tasks is activated by an event or an alarm; and
providing information relevant to activation of each task of the portion of tasks for automatically performing static code analysis of the parts of the implementation code.

22. The method of claim 21, further comprising storing in memory the information about task identity and the task attributes, the information about the ISRs, implemented computational thread identifiers, and information about activation of each task as configuration data for a code-checking system.

23. The method of claim 1, wherein the one or more data structures are data structures of a specified model and the parts of the implementation code are prepared from the one or more data structures according to a standardized methodology.

24. The method of claim 23, wherein the one or more data structures are ARXML files of an AUTOSAR compliant specified model.

25. The method of claim 23, wherein the specified model is a specified model compliant with OSEK, UML, SysML, AADL, MARTE, or ARINC.

26. The method of claim 1, further comprising performing static analysis of the parts of the implementation code, wherein the static analysis comprises one or a combination of: abstract interpretation, model checking, and satisfiability solving.

27. A non-transitory computer readable storage medium storing computer executable instructions thereon, that, when executed by at least one processor, cause a system that includes the at least one processor to perform acts of claim 1.

28. A code-analyzing system comprising at least one hardware processor configured to execute computer executable instructions to:
receive one or more data structures containing information that specifies tasks to be implemented in the form of parts of implementation code, wherein a portion of the tasks are to be executed concurrently on a processor using different computational threads within the parts of the implementation code;
automatically analyze the one or more data structures to identify specified task identifiers for each task of the portion of the tasks or interrupt service routines (ISRs) that can execute concurrently with the tasks on the processor;
automatically analyze the one or more data structures to identify task attributes or information regarding the ISRs relevant to concurrent execution of the portion of the tasks or the ISRs on the processor;
generate comparative code based on at least a portion of the one or more data structures and the specified task identifiers or the identified ISRs;
identify, based on the comparative code and a portion of the implementation code, computational threads in the parts of the implementation code that correspond to the specified task identifiers or the ISRs;
associate the received task attributes or the information regarding the ISRs with their corresponding computational threads; and
detect, or prove the absence of, defects in the parts of the implementation code based on the associated task attributes or the associated information regarding the ISRs.

* * * * *